US006918456B2

(12) United States Patent
Dennison et al.

(10) Patent No.: US 6,918,456 B2
(45) Date of Patent: Jul. 19, 2005

(54) FLUID INLET GRILLE WITH AERODYNAMIC GRILLE BARS

(75) Inventors: Travis E. Dennison, Fort Wayne, IN (US); Sunil K. Jain, Fort Wayne, IN (US); Floyd A. Etzler, Convoy, OH (US); Peter J. Voors, Fort Wayne, IN (US)

(73) Assignee: International Truck International Property Company, LLC, Warrenville, IL (US)

( * ) Notice: Subject to any disclaimer, the term of this patent is extended or adjusted under 35 U.S.C. 154(b) by 0 days.

(21) Appl. No.: 10/283,465

(22) Filed: Oct. 30, 2002

(65) Prior Publication Data

US 2003/0106730 A1 Jun. 12, 2003

Related U.S. Application Data

(63) Continuation-in-part of application No. 10/213,180, filed on Aug. 6, 2002.
(60) Provisional application No. 60/310,921, filed on Aug. 8, 2001.

(51) Int. Cl.⁷ .............................................. B60K 11/08
(52) U.S. Cl. ................................................... 180/68.1
(58) Field of Search ........................... 180/68.1, 68.2, 180/68.3, 68.4, 68.6; 296/194; 293/115, 113; 165/44; 123/41.04

(56) References Cited

U.S. PATENT DOCUMENTS

| 1,435,345 | A | * | 11/1922 | Stewart | 180/68.4 |
|---|---|---|---|---|---|
| 2,614,654 | A | * | 10/1952 | Strinden | 454/158 |
| 3,762,489 | A | * | 10/1973 | Proksch et al. | 180/68.1 |
| 3,888,327 | A | * | 6/1975 | Reece | 180/68.6 |
| 4,124,066 | A | * | 11/1978 | Taylor | 165/98 |
| 4,169,501 | A | * | 10/1979 | Takeuchi et al. | 165/126 |
| 4,753,288 | A | * | 6/1988 | Harvey | 165/98 |
| 6,405,819 | B1 | * | 6/2002 | Ohkura et al. | 180/68.1 |
| 6,470,961 | B1 | * | 10/2002 | Case | 165/78 |

FOREIGN PATENT DOCUMENTS

| DE | 943158 | * | 5/1956 | 180/68.1 |
|---|---|---|---|---|
| DE | 37 31 980 | * | 3/1989 | 180/68.6 |
| EP | 0 030 319 | * | 6/1981 | 180/68.6 |

* cited by examiner

Primary Examiner—Frank Vanaman
(74) Attorney, Agent, or Firm—Jeffrey P. Calfa; Dennis Kelly Sullivan; Susan L. Lukasik

(57) ABSTRACT

A fluid inlet grille (12) with aerodynamic grille bars (13) formed by leading grille bars (46) and trailing grille bars (47) separated by gaps (44). Each of the novel aerodynamic grille bars of the fluid inlet grille is constructed in such a manner that along a majority of its length its transverse cross section has a maximum width greater than its trailing edge width.

14 Claims, 24 Drawing Sheets

FLUID INLET GRILLE WITH AERODYNAMIC GRILLE BARS

This application is a continuation-in-part of patent application Ser. No. 10/213180 filed Aug. 6, 2002 which is a non-provisional application that claims priority under provisional patent application Ser. No. 60/310,921 filed Aug. 8, 2001.

BACKGROUND OF THE INVENTION

This invention relates to fluid inlet grilles that are constructed to span a fluid flow inlet and allow fluid to flow through the fluid flow inlet while preventing large objects from passing through the fluid flow inlet. Such fluid inlet grilles have a plurality of grille bars, each of which extends across a portion of the fluid flow inlet that the fluid inlet grille spans. A plurality of fluid flow spaces, through which fluid may flow, are defined between the grille bars of such fluid inlet grilles within the fluid flow inlet spanned by the fluid inlet grille. Objects larger than the fluid flow spaces defined between the grille bars of the fluid inlet grille are prevented from traveling through the fluid flow inlet. The use of such fluid inlet grilles is well known in many different applications. One application where such fluid inlet grilles are used, for example, is in vehicles. Many vehicles have a fluid flow inlet that is defined between body panels of the vehicle and that is disposed in front of one or more heat exchangers such as radiators, air conditioner condensers, charge air coolers, and/or transmission coolers. A fluid inlet grille mounted to a vehicle in such a manner allows the flow of fluid, which is usually air, through the fluid flow spaces between the grille bars and then through the heat exchangers disposed behind the fluid inlet grille. The grille bars of a fluid inlet grille mounted to a vehicle in such a manner also prevent large objects from traveling through the fluid flow inlet and damaging or restricting fluid flow through the heat exchangers disposed behind the fluid flow inlet.

In many applications of such a fluid inlet grille the fluid flow is most always in the same direction through the fluid flow inlet that the fluid inlet grille spans. The mounting of a fluid inlet grille to a vehicle to protect one or more heat exchangers mounted behind the fluid inlet grille, as described above, is one example of an application of a fluid inlet grille where the fluid flow is almost always in the same direction through the fluid inlet which the fluid inlet grille spans. In this application the fluid flow through the fluid flow inlet is almost always in a direction from in front of the fluid inlet grille, through the fluid flow inlet that the fluid inlet grille spans, and then toward and eventually through the one or more heat exchangers mounted behind the fluid inlet grille. For purposes of this disclosure the direction that fluid almost always flows toward and through a fluid flow inlet that a fluid inlet grille spans will be referred to as the prevailing fluid inflow direction. A fluid inlet grille that is used in such an application, in which there exists a prevailing fluid inflow direction, and its grille bars have opposite sides that may be considered an upstream side and a downstream side respectively. The upstream side of such a fluid inlet grille and its grille bars being the side that fluid first passes as it flows in the prevailing fluid inflow direction toward and through the fluid flow inlet which the fluid inlet grille spans. The downstream side of the fluid inlet grille and its grille bars being the side that fluid last passes as it flows in the prevailing fluid inflow direction through and away from the fluid flow inlet.

In many applications in which a fluid inlet grille is used the aerodynamic properties of the fluid inlet grille are important. It is generally desirable that the fluid inlet grille provide as little resistance to flow of the fluid through the fluid flow inlet as possible. It is also preferred that the fluid inlet grille is constructed in such a manner that the velocity distribution of the fluid flow evens out in as short a distance as possible from the downstream side of the fluid inlet grille. A vehicle that has a fluid inlet grille mounted in front of one or more heat exchangers, as described above, is an example of an application in which a fluid inlet grille is used and in which it is desirable that the fluid inlet grille have such aerodynamic properties. In such an application, all other factors being equal, reducing the resistance of the fluid inlet grille to the flow of fluid past it will result in increased velocity of the fluid flow after it has passed the fluid inlet grille and also as it passes through the heat exchangers mounted on the downstream side of the fluid inlet grille. Increased velocity of the fluid flow through the heat exchangers increases the rate of heat transfer and, thus, improves the performance of the heat exchangers. The uniformity of the velocity distribution of the fluid flow as it passes through the heat exchangers in such an application also affects the performance of the heat exchangers. The more uniform the velocity of the fluid flow through the heat exchangers is in directions perpendicular to the direction in which it is flowing, the better the performance of the heat exchangers will be. When fluid flows through a fluid flow inlet past a fluid inlet grille, there is a stagnation area adjacent the downstream side of each of the grille bars. The velocity of the fluid flow in the stagnation area downstream of each of the grille bars is substantially less than the velocity of the fluid flow to either side of the stagnation area in directions perpendicular to the flow of the fluid through the fluid inlet opening. The stagnation area behind each of the grille bars does, however, have a finite length and at some distance in the downstream direction from each grille bar the velocity of the fluid flow is equal to the velocity of adjacent portions of the fluid flow. If a heat exchanger is mounted upon the downstream side of a fluid inlet grille at a distance close enough to the fluid inlet grille that the stagnation area of one or more of the grille bars extends into the heat exchanger, the performance of the heat exchanger will be compromised. In such a situation, the fluid flow through those portions of the heat exchanger into which any stagnation areas of the grille bars extend will have a significantly lower velocity than the fluid flow through adjacent portions of the heat exchanger. In such a situation, less heat will be transferred between those portions of the heat exchanger that are disposed within a stagnation area downstream of a grille bar and the fluid flowing through them than will be transferred between adjacent portions of the heat exchanger and the fluid flowing through them. Thus, the overall performance of the heat exchanger is compromised when it is placed close enough to the fluid inlet grille that one or more portions of the heat exchanger are disposed within stagnation area(s) of the grille bars. As a result, many vehicles that have one or more heat exchangers mounted behind a fluid flow inlet, across which a fluid inlet grille spans, have the heat exchangers mounted sufficiently far enough away from the fluid inlet grille to be beyond the stagnation area of each of the grille bars of the fluid inlet grille. In many circumstances, however, space for mounting of components is at a premium on a vehicle and the need to place a heat exchanger at such a distance from a fluid inlet grille on its downstream side can increase the challenges of constructing a vehicle in a compact manner while providing all desirable features.

SUMMARY OF INVENTION

As a result, an object of the present invention is to provide a fluid inlet grille that presents a relatively low resistance to the flow of fluid past it. Another object of the present invention is to provide a fluid inlet grille that comprises grille bars that have a relatively short stagnation area adjacent their downstream side when fluid is flowing past them.

The fluid inlet grille of the present invention comprises a plurality of aerodynamic grille bars that are constructed and oriented in such a manner that their longitudinal axes extend substantially perpendicular to the direction in which fluid flows past the fluid inlet grille. Cross-sections of these aerodynamic grille bars perpendicular to their longitudinal axes, which will hereinafter be referred to as transverse cross-sections, have a chord length, which is the distance between the portion of the aerodynamic grille bar at its upstream side and the portion of the aerodynamic grille bar at its downstream side. For purposes of this disclosure a line that extends between a midpoint of the portion of a transverse cross-section of the aerodynamic grille bar at its upstream side and the midpoint of the portion of the transverse cross-section of the aerodynamic grille at its downstream side is considered to be a chord line of the transverse cross-section. The width of a particular portion of each grille bar is the distance between outer portions of the grille bar in directions perpendicular to both the longitudinal axis and the chord line of that portion of the grille bar. Each transverse cross-section of a grille bar has a leading edge width, a maximum width, and a trailing edge width. The leading edge width of a grille bar is the width of the portion of the grille bar at the upstream side of the grille bar. The maximum width of the grille bar being the width of the widest portion of a particular transverse cross-section of the grille bar. The trailing edge width of the grille bar is the width of the portion of the grille bar at its downstream side. Of course different transverse cross-sections of a given aerodynamic grille bar according to the present invention may have different chord lengths, leading edge widths, maximum widths, and trailing edge widths. Each of a plurality of the aerodynamic grille bars of the fluid inlet grille of the present invention has, along a majority of its length, transverse cross-sections that have a chord length that is substantially greater than a maximum width and a trailing edge width that is less than the maximum width. Aerodynamic grille bars shaped in such a way present relatively little resistance to the flow of fluid past them and have a stagnation area of relatively short length adjacent their downstream side when fluid flows past them. As a result, a fluid inlet grille that is constructed with a plurality of aerodynamic grille bars so constructed presents relatively little resistance to the flow of fluid past it. Such a fluid inlet grille also provides for a relatively uniform distribution of velocity of a fluid flow that has passed the fluid inlet grille at a relatively short distance to the downstream side of the fluid inlet grille. Such a fluid inlet grille is particularly useful when mounted within a fluid flow inlet of a vehicle with one or more heat exchangers disposed upon the downstream side of the fluid inlet grille. Such an application of a fluid inlet grille constructed in such a manner allows for location of one or more heat exchangers relatively close to the fluid inlet grille on its downstream side while providing for a fluid flow through the heat exchangers that has a relatively high velocity and also a relatively uniform velocity distribution in directions perpendicular to the fluid flow. Thus, it can be seen that the above-mentioned objects of the present invention as well as others not mentioned have been met.

DRAWINGS

Other objects and advantages of the invention will become more apparent upon perusal of the detailed description thereof and upon inspection of the drawings in which.

Figure 9:
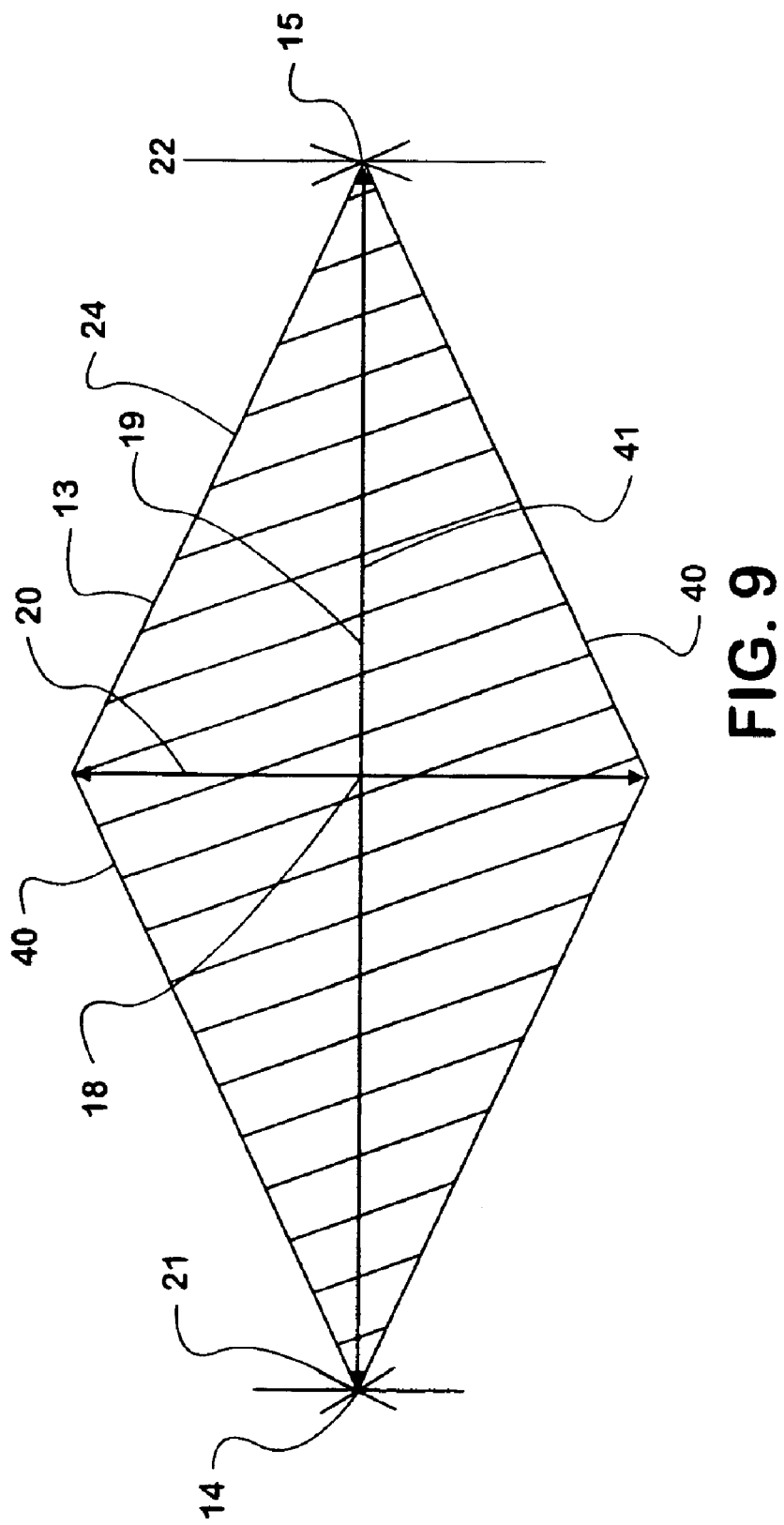

FIG. 9. is a view of a transverse cross-section of a fourth embodiment of a aerodynamic grille bar according to the present invention with a monolithic construction.

Figure 10:
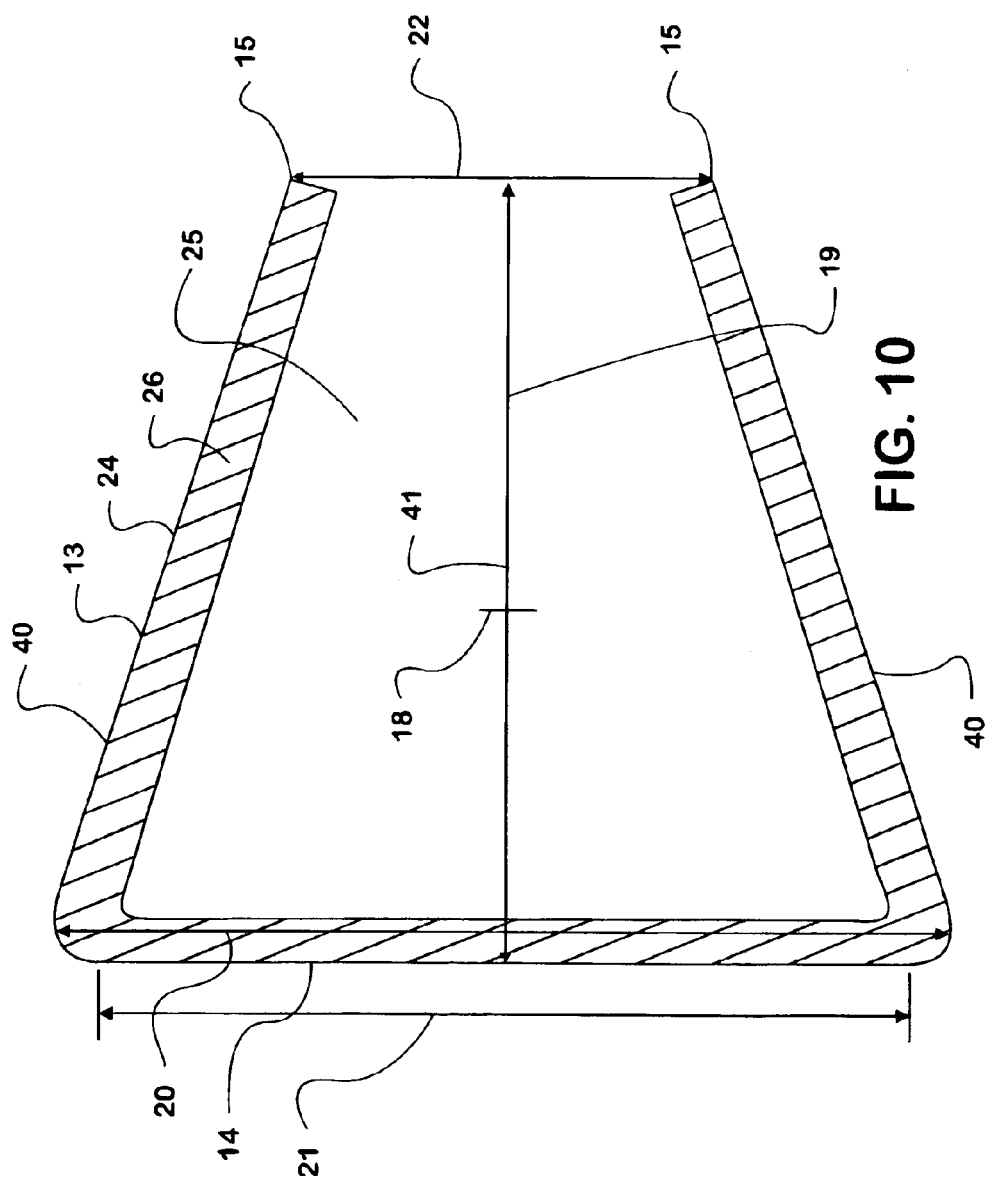

FIG. 10 is a view of a transverse cross-section of a fifth embodiment of an aerodynamic grille bar according to the present invention with a monolithic construction.

Figure 11:
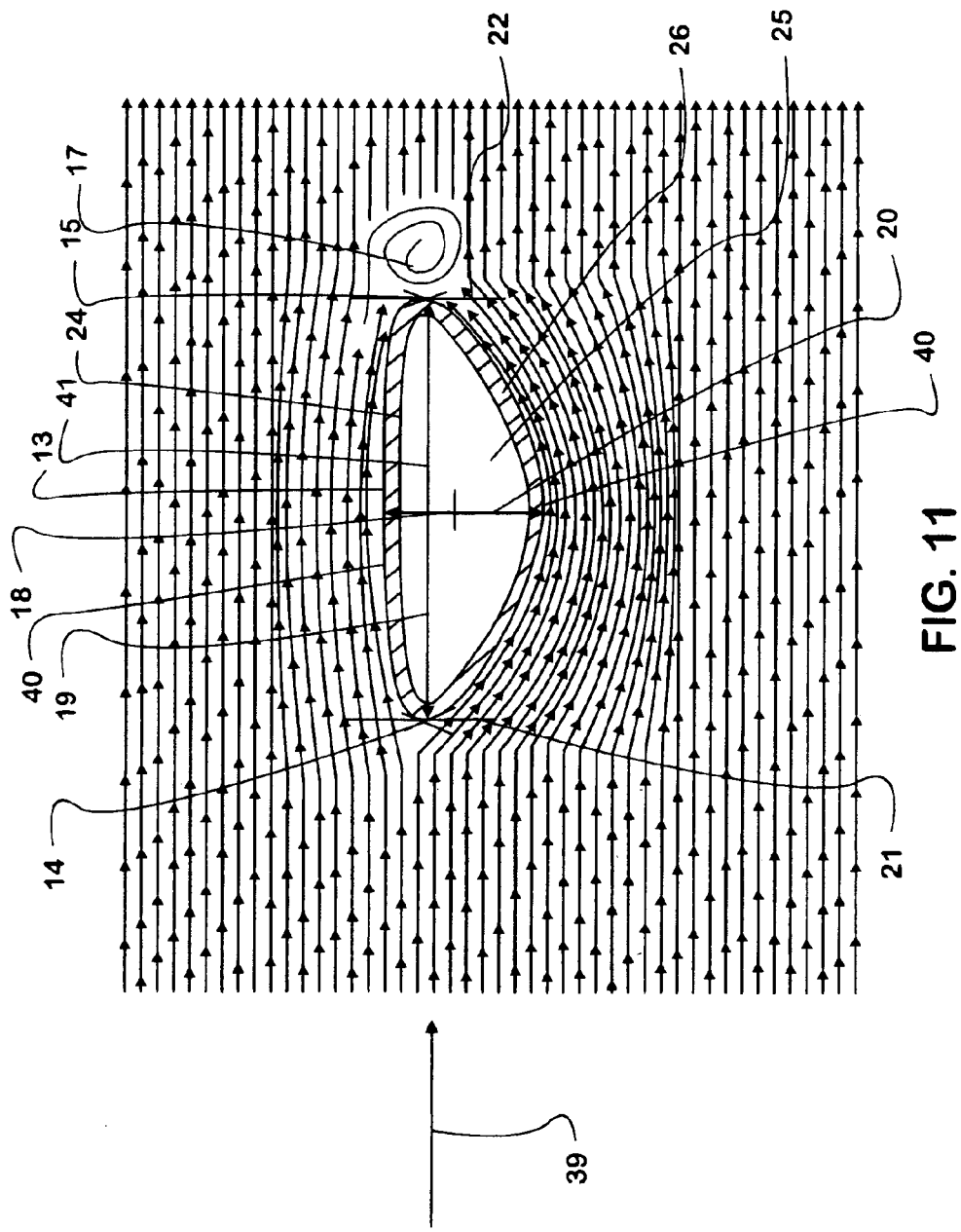

FIG. 11 is a view of a transverse cross-section of a sixth embodiment of an aerodynamic grille bar according to the present invention showing fluid flow patterns around the grille bar as predicted by computational fluid dynamics analysis.

Figure 12:
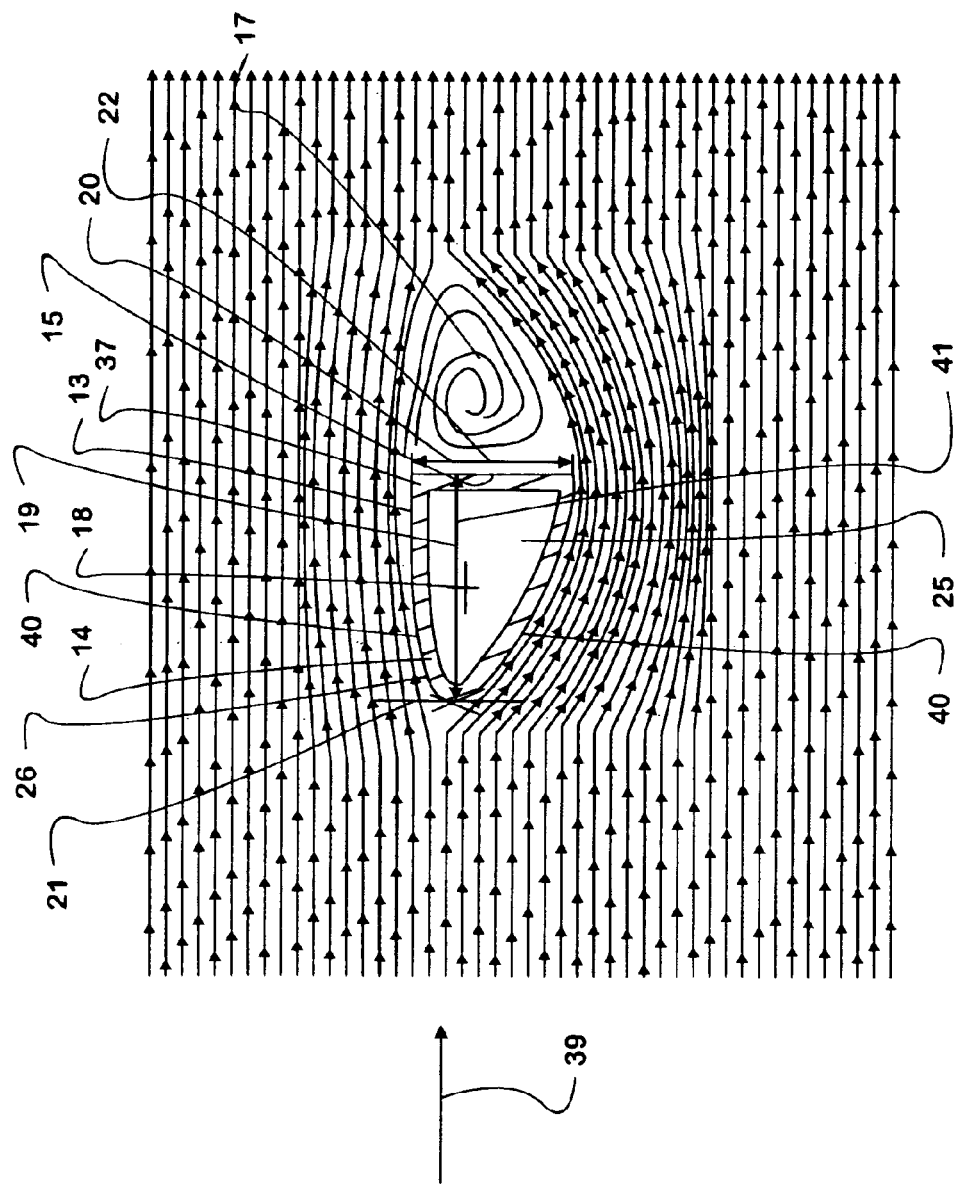

FIG. 12 is a view of a transverse cross-section of a second embodiment of a prior art grille bar showing fluid flow patterns around the grille bar as predicted by computational fluid dynamics analysis.

Figure 13:
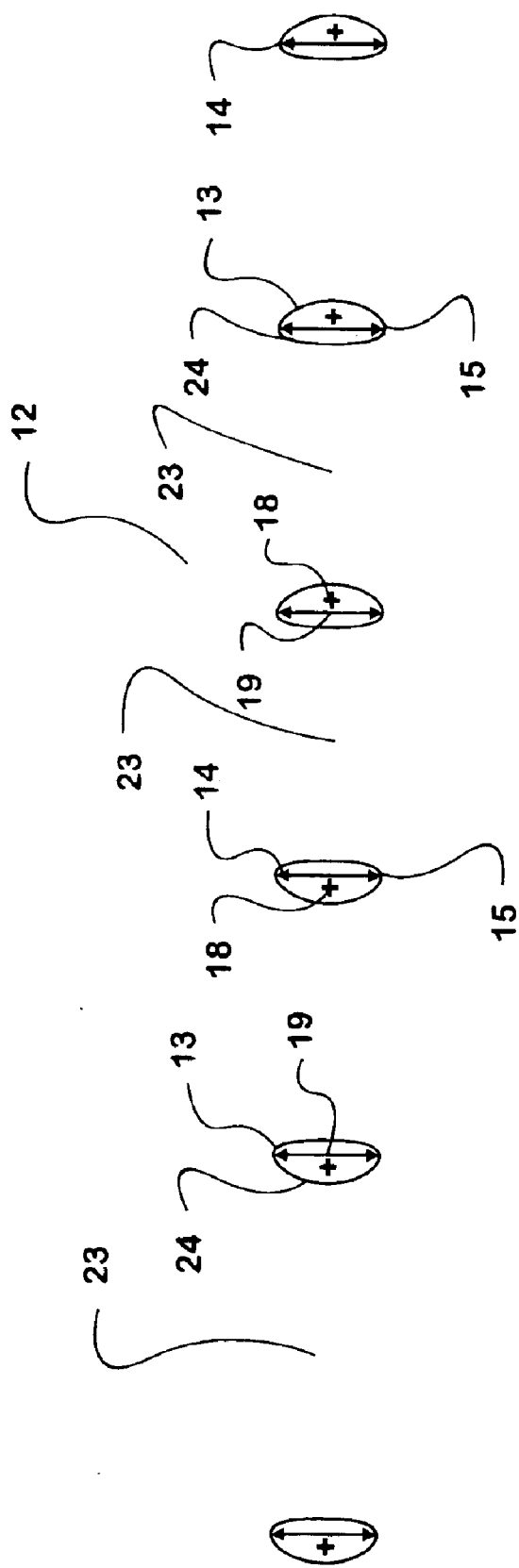

FIG. 13 is a sectional view of a fluid inlet grille that comprises a plurality of aerodynamic grille bars that have the same transverse cross-section as the aerodynamic grille bar shown in FIG. 11.

Figure 13A:
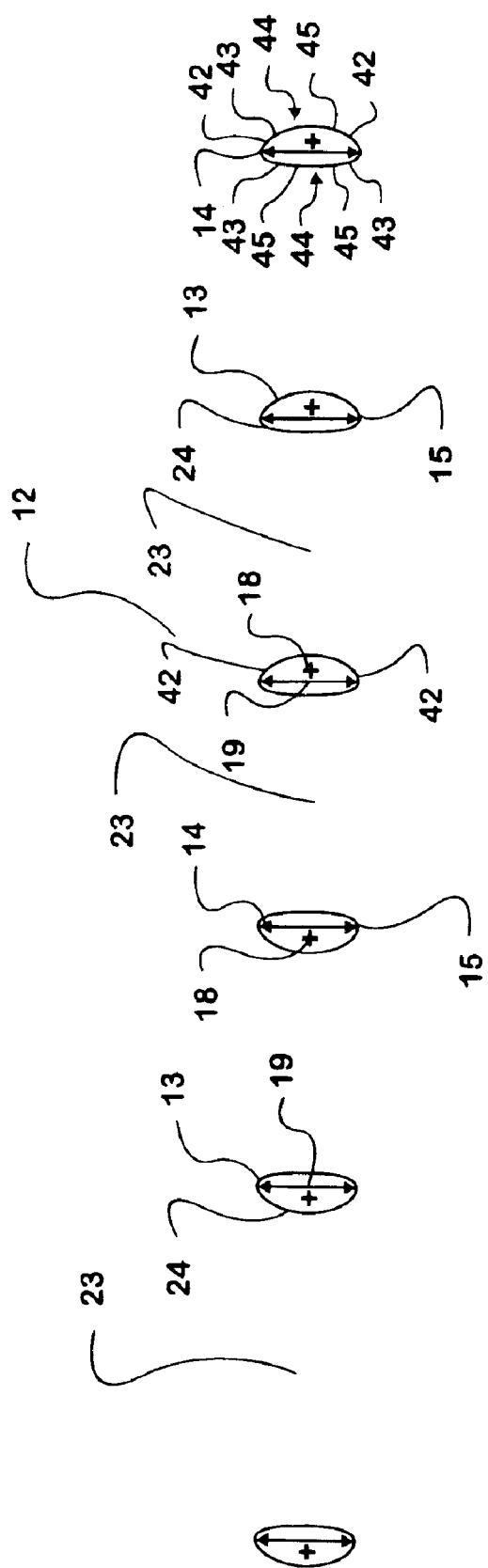

FIG. 13a is a sectional view of a fluid inlet grille that comprises a plurality of aerodynamic grille bars that are of a composite construction and that have a shape similar to the aerodynamic grille bar shown in FIG. 11.

Figure 14:
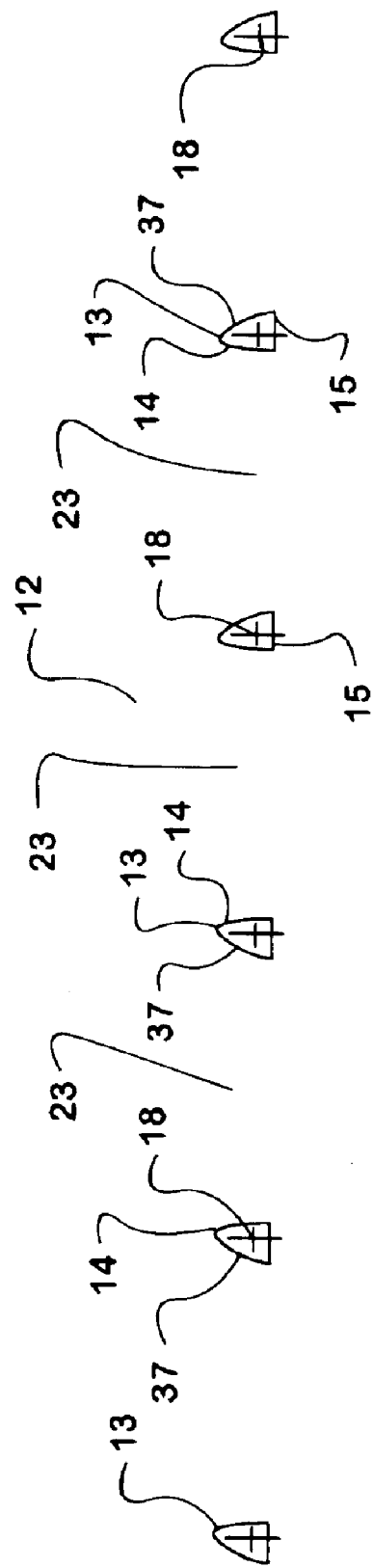

FIG. 14 is a sectional view of a fluid inlet grille that comprises a plurality of prior art grille bars that have the same transverse cross-section as the grille bar shown in FIG. 12.

Figure 15:
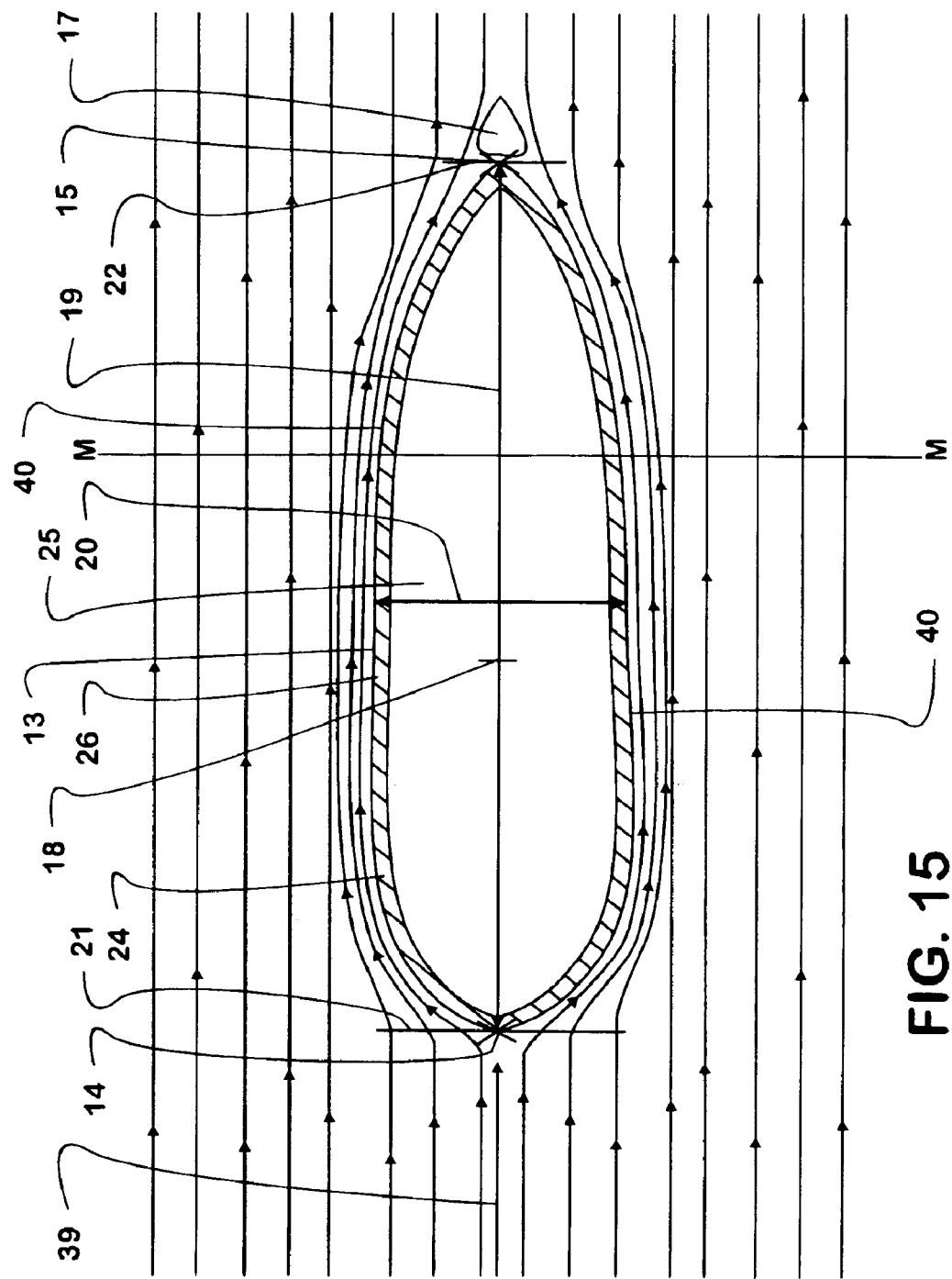

FIG. 15 is a view of a transverse cross-section of a seventh embodiment of a aerodynamic grille bar according to the present invention that has a monolithic construction.

Figure 15A:
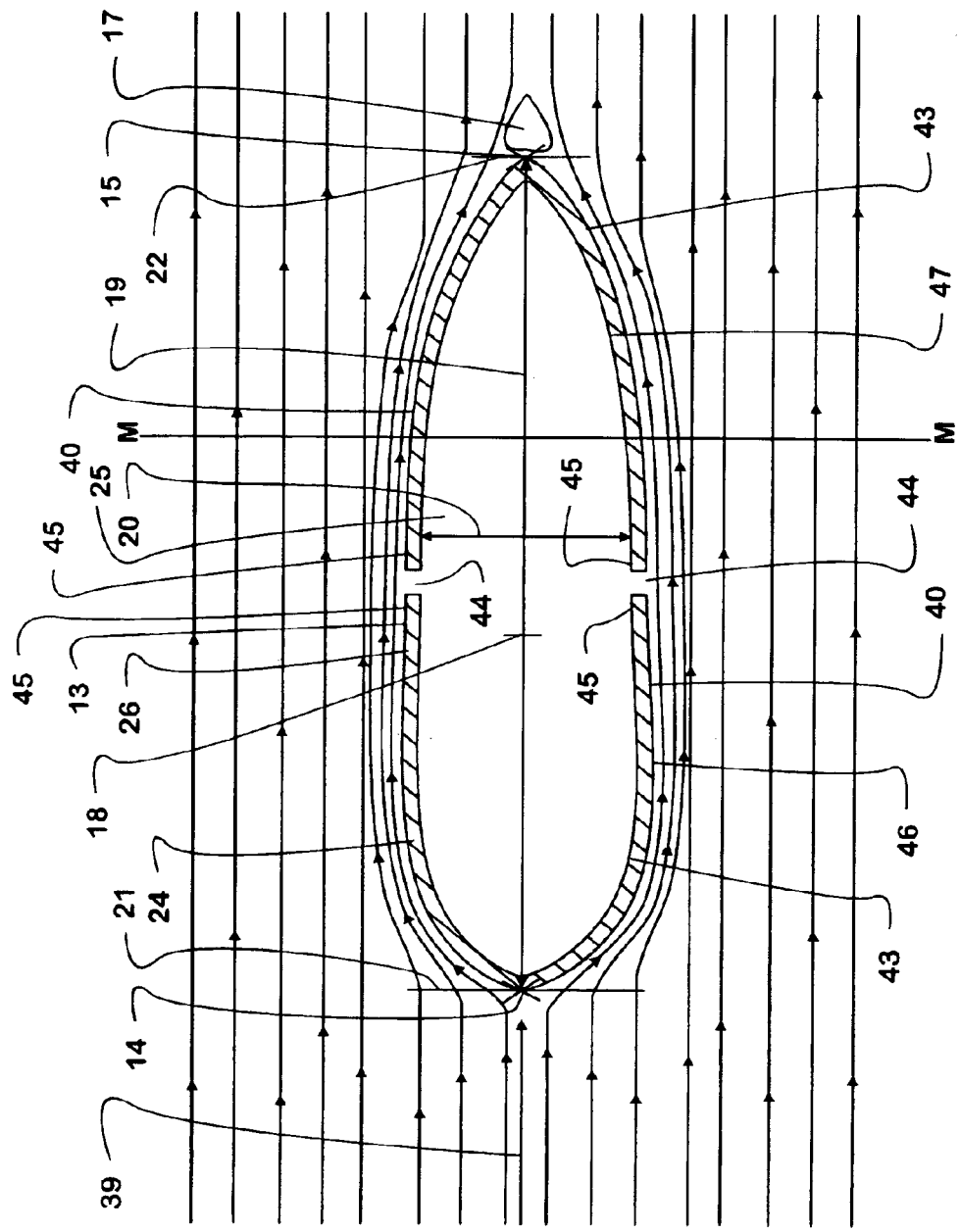

FIG. 15a is a view of a transverse cross-section of an eighth embodiment of an aerodynamic grille bar according to the present invention that has a composite construction.

Figure 16:
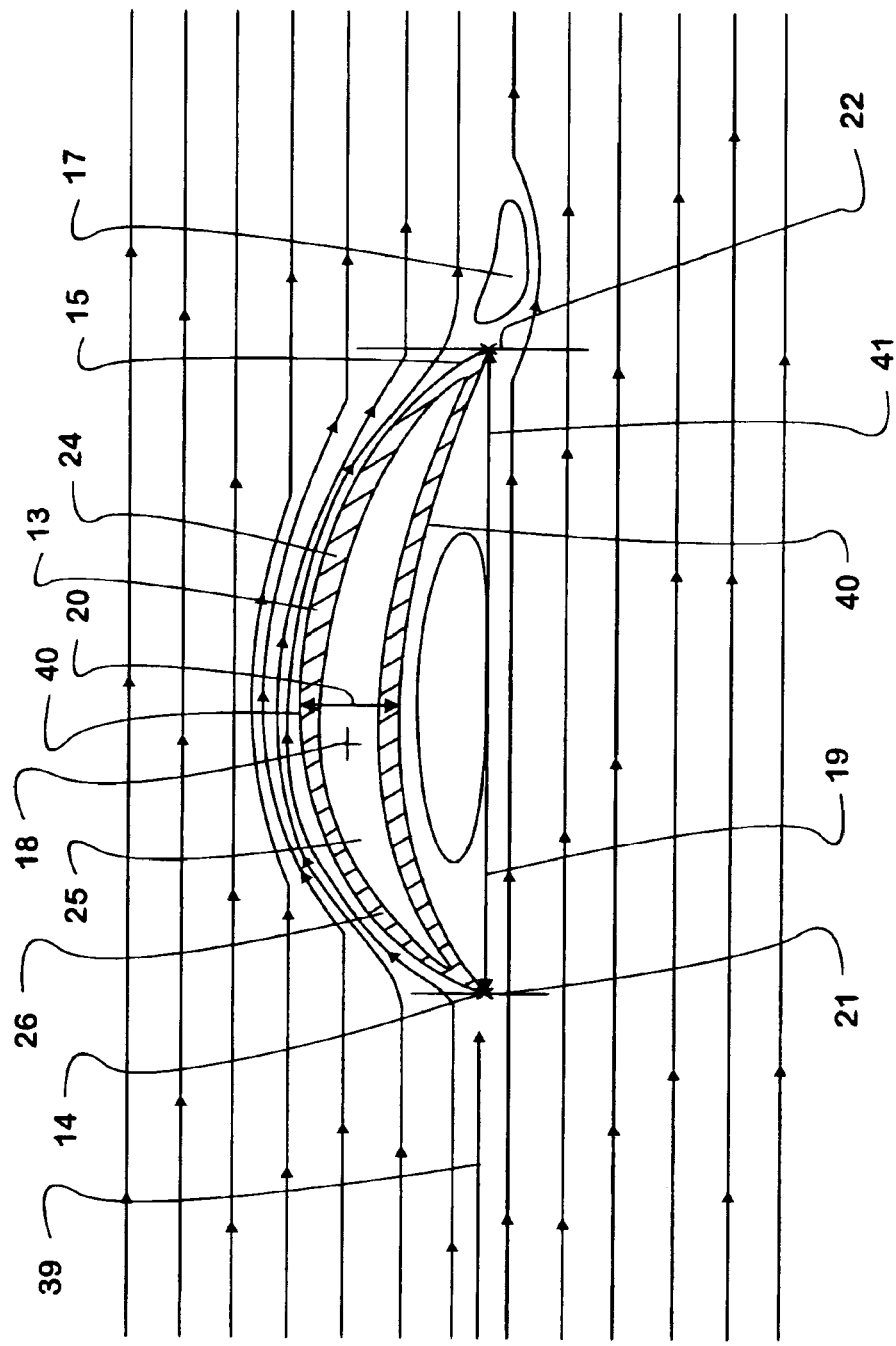

FIG. 16 is a view of a transverse cross-section of a ninth embodiment of an aerodynamic grille bar according to the present invention that has a monolithic construction.

Figure 1:
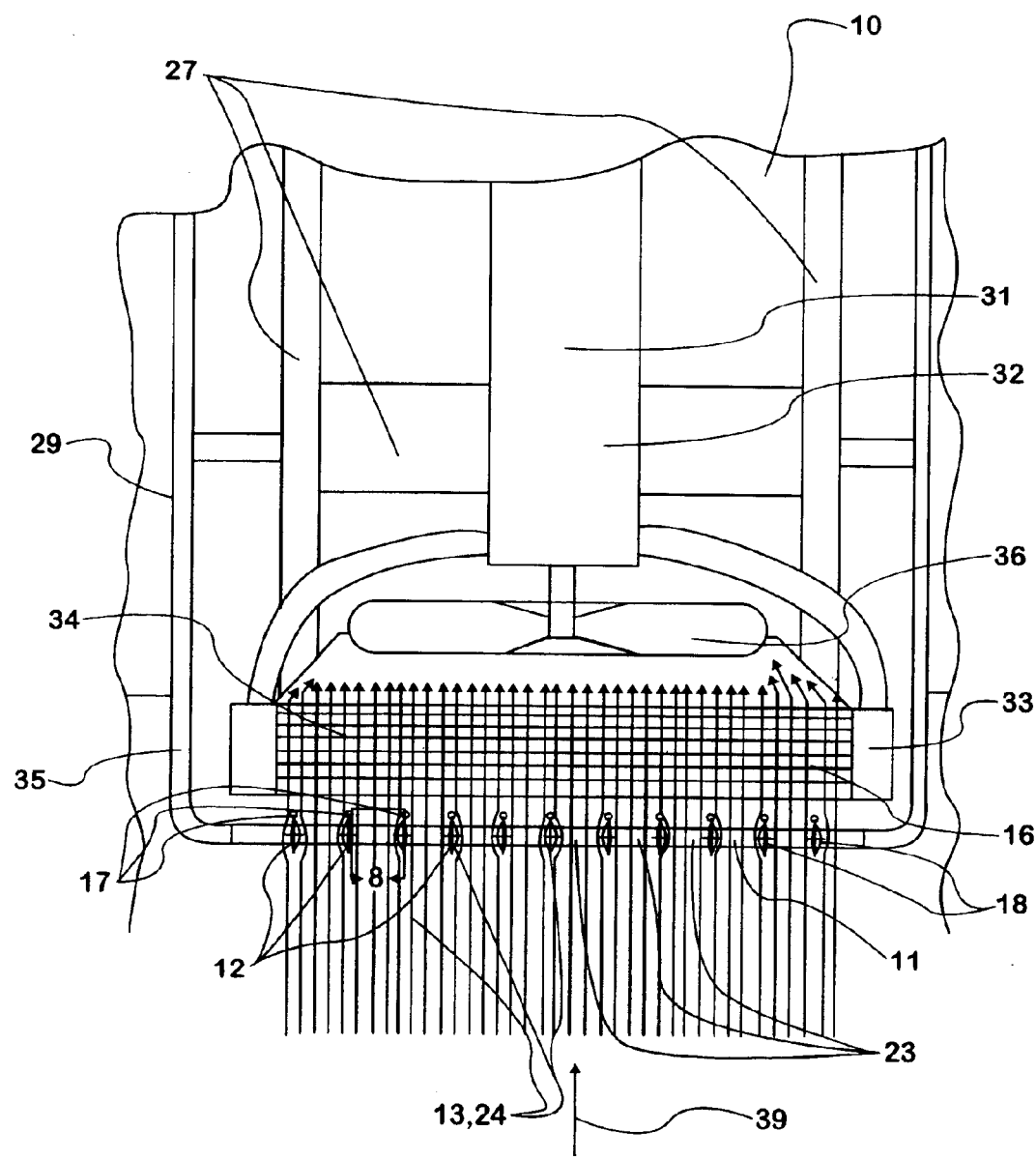
FIG. 1 is sectional view through line I—I of FIG. 3 showing a portion of a vehicle with a fluid inlet grille that comprises aerodynamic grille bars according to the present invention.
Figure 2:
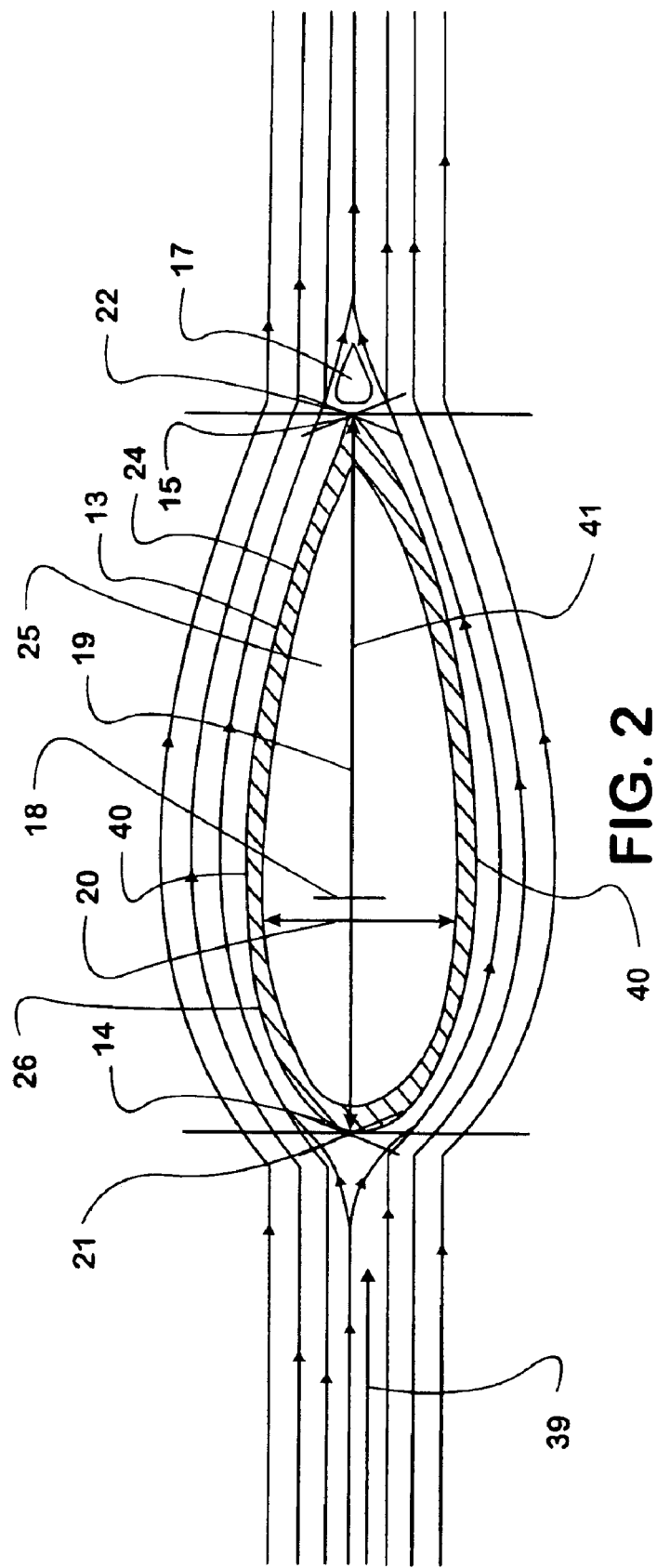
FIG. 2 is a view of a transverse cross-section of a first embodiment of an aerodynamic grille bar according to the present invention that has a monolithic construction with the chord line thereof oriented at a relatively small angle to the prevailing fluid inflow direction.
Figure 2A:
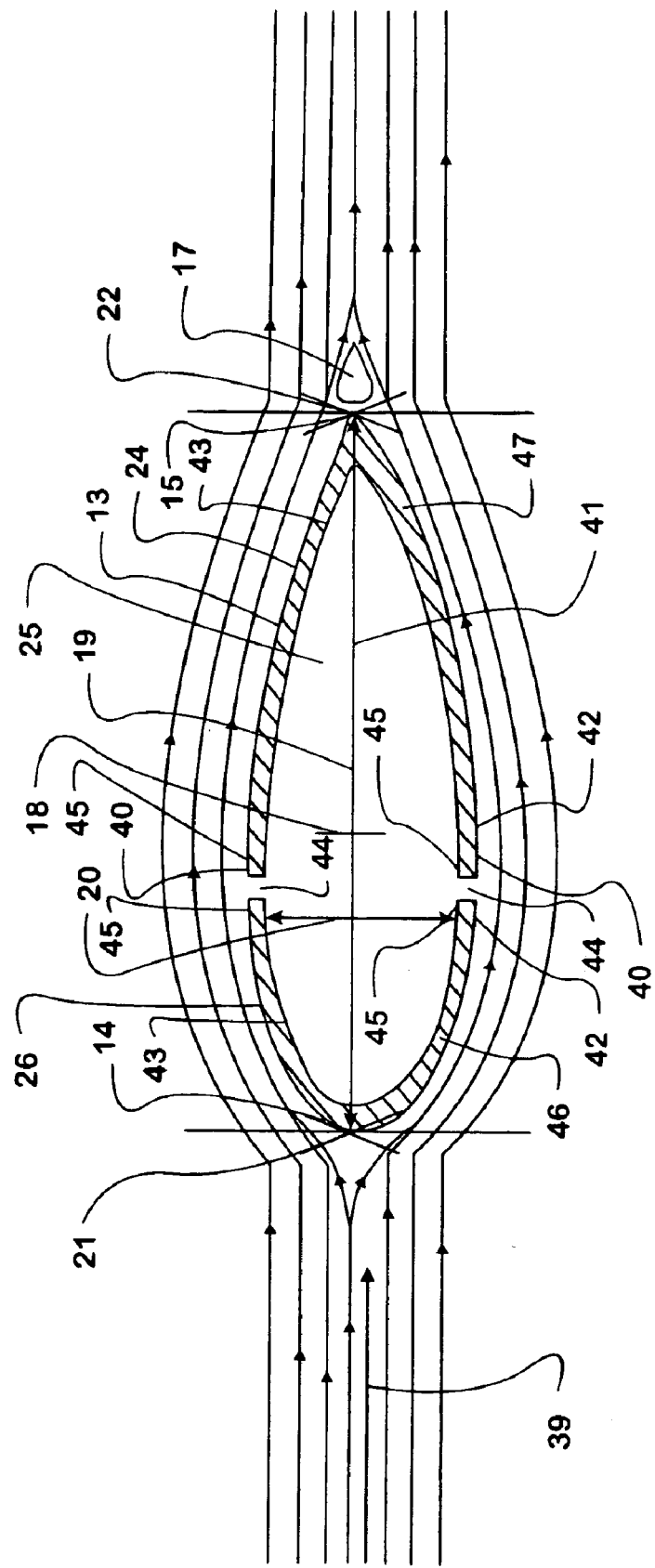
FIG. 2a is a view of a transverse cross-section of a second embodiment of an aerodynamic grille bar according to the present invention that has a composite construction with the chord line thereof oriented at a relatively small angle to the prevailing fluid inflow direction.
Figure 3:
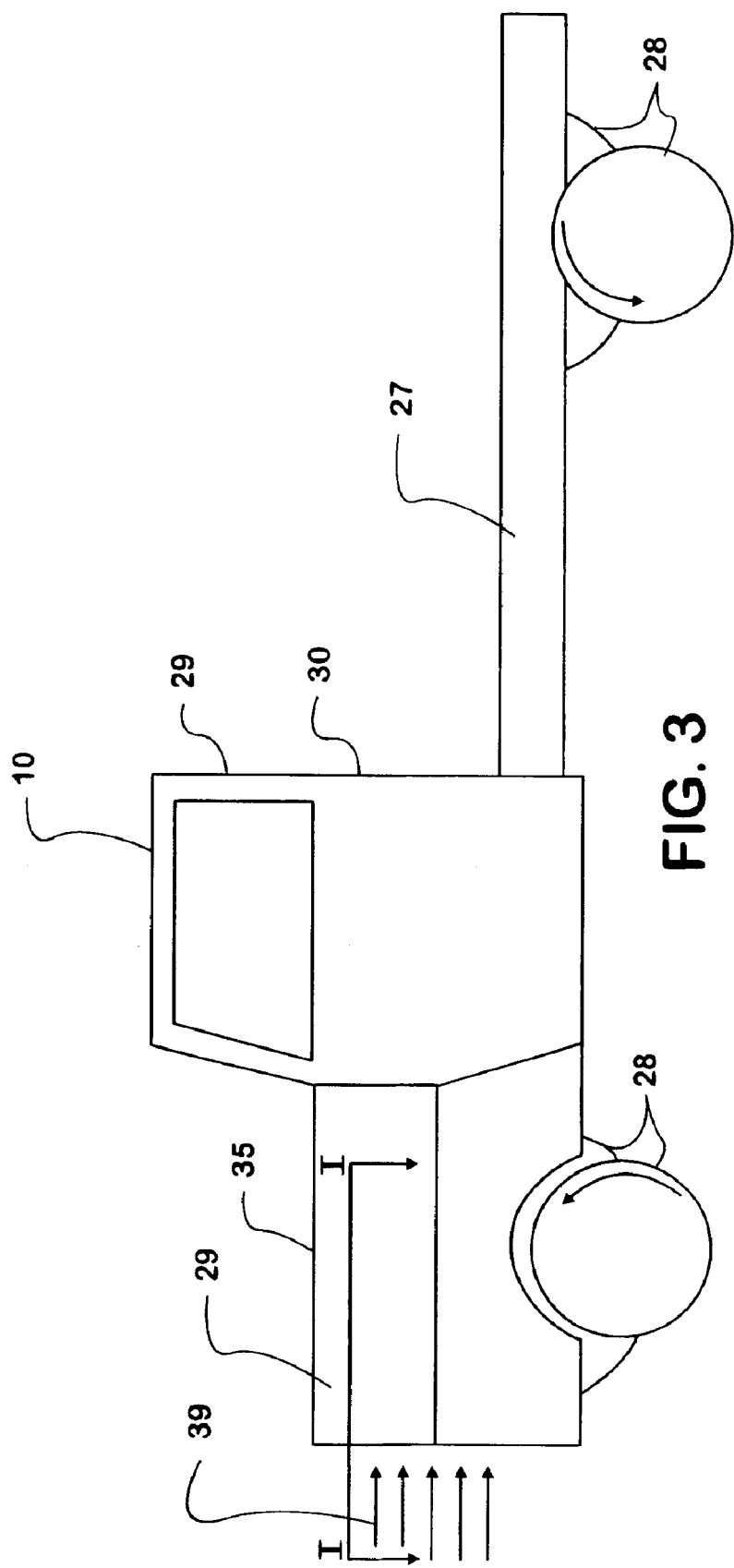
FIG. 3 is a side elevational view of a vehicle that comprises a fluid inlet grille with aerodynamic grille bars according to the present invention.
Figure 4:
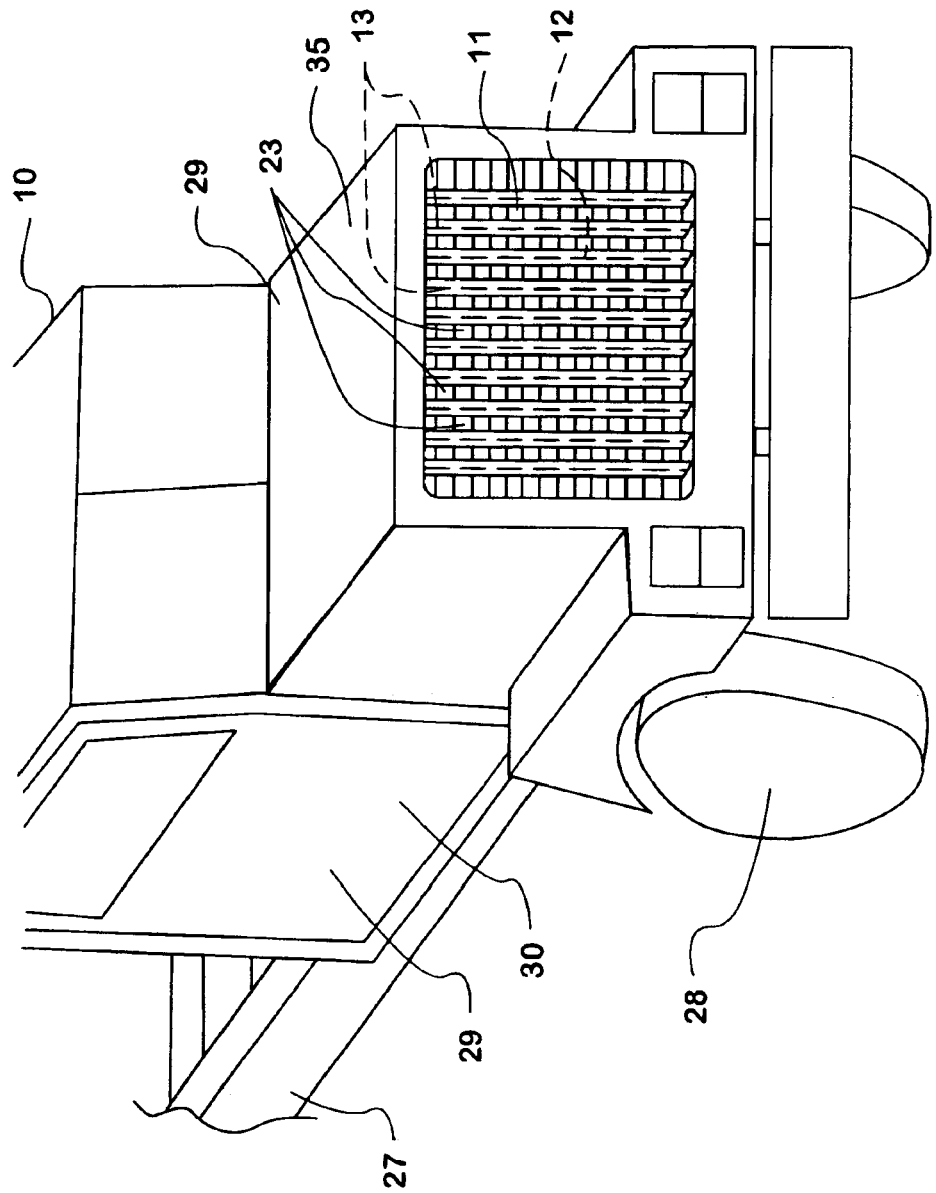
FIG. 4 is a perspective view of a vehicle that comprises a fluid inlet grille with aerodynamic grille bars according to the present invention.
Figure 5:
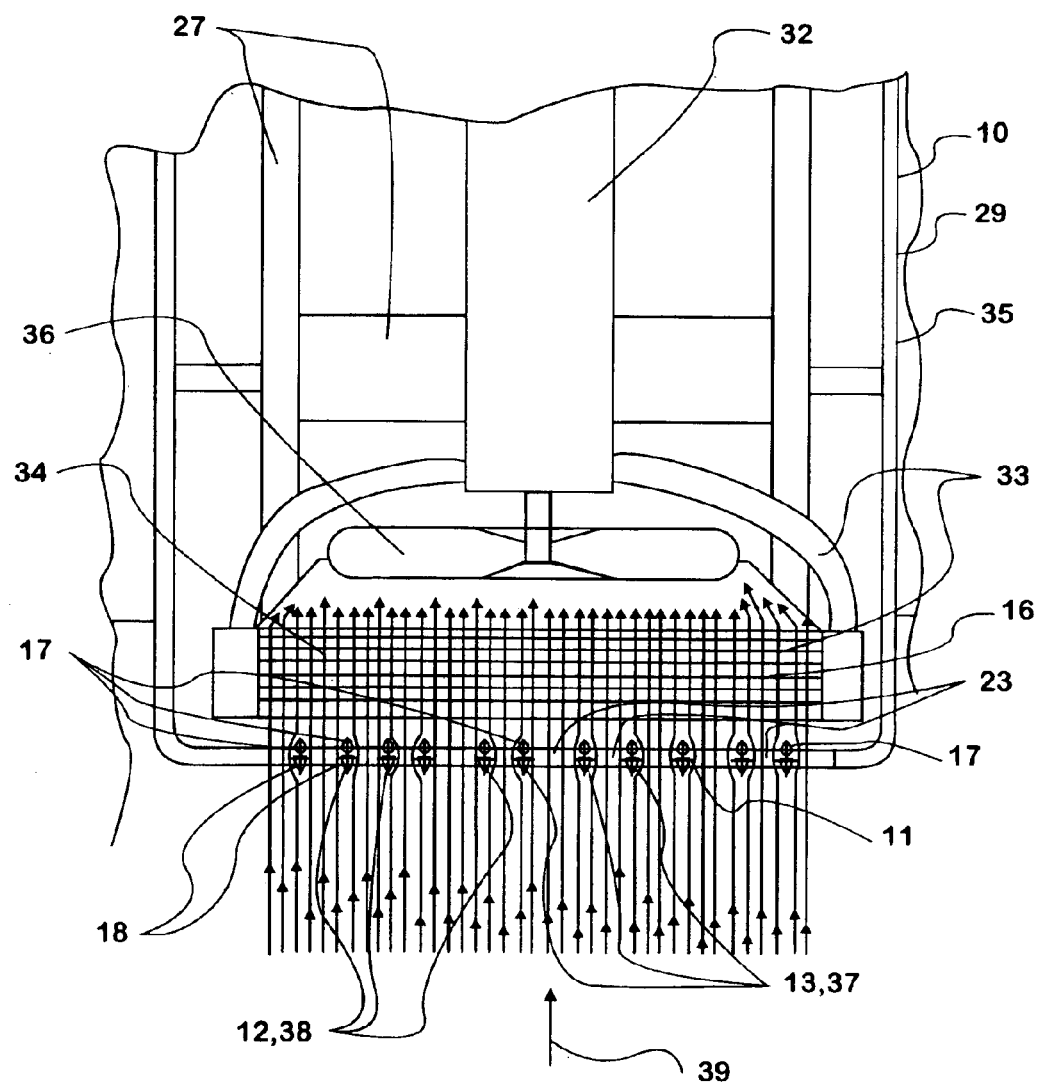
FIG. 5 is a sectional view through a front portion of a vehicle that comprises a fluid inlet grille with prior art grille bars.
Figure 6:
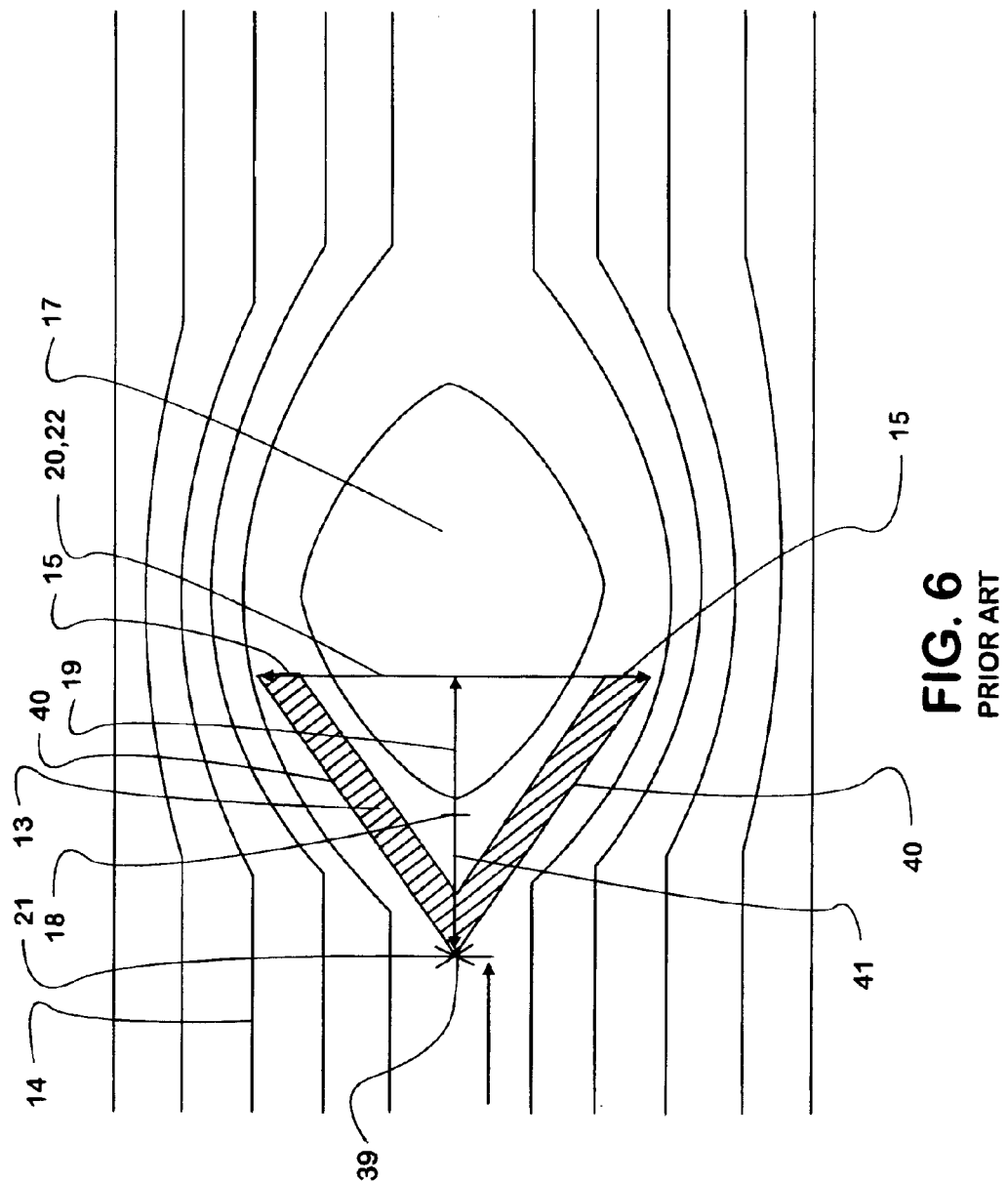
FIG. 6 is a view of a transverse cross-section of a first embodiment of a prior art grille bar.
Figure 7:
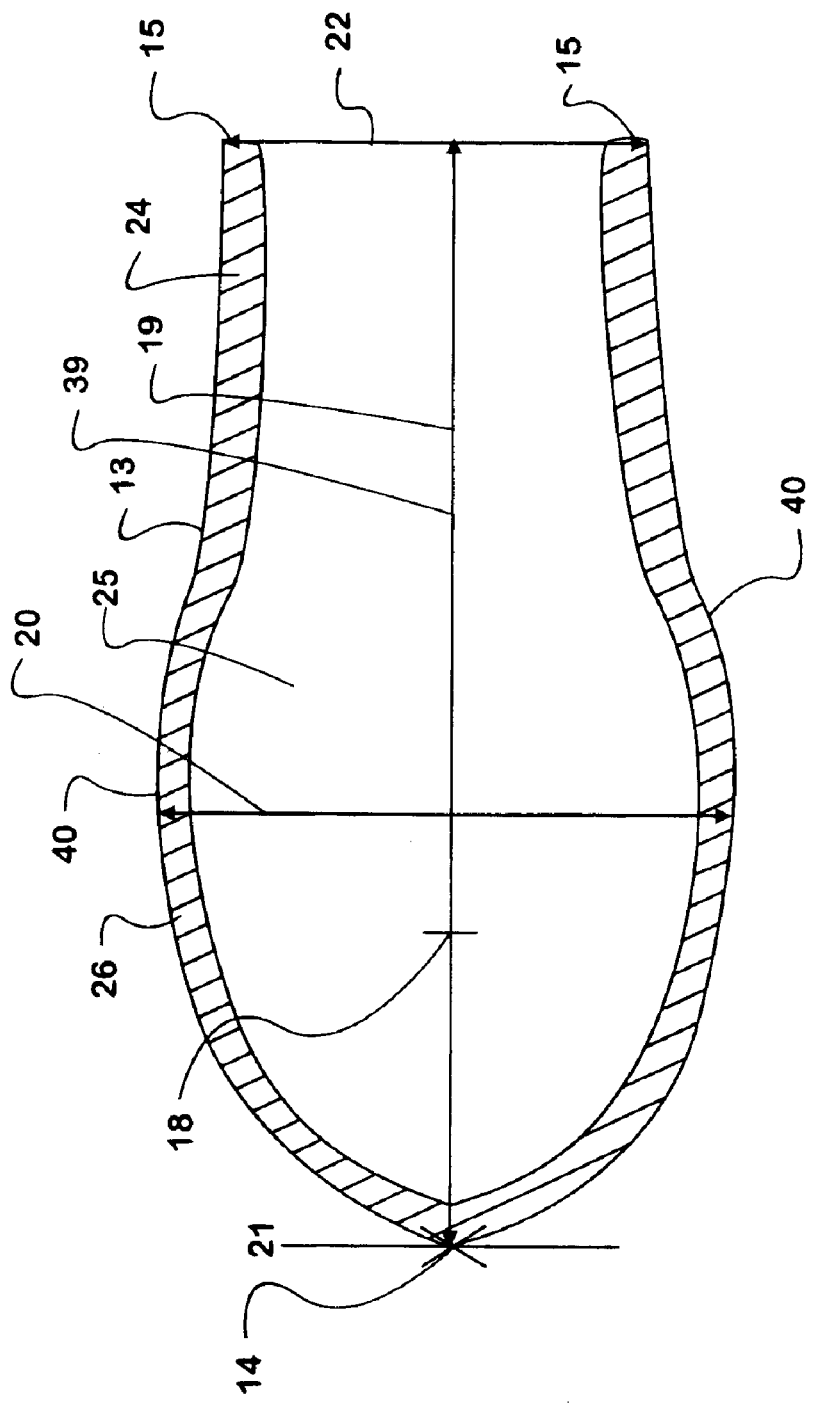
FIG. 7 is a view of a transverse cross-section of a third embodiment of an aerodynamic grille bar according to the present invention that has monolithic construction.
Figure 17:
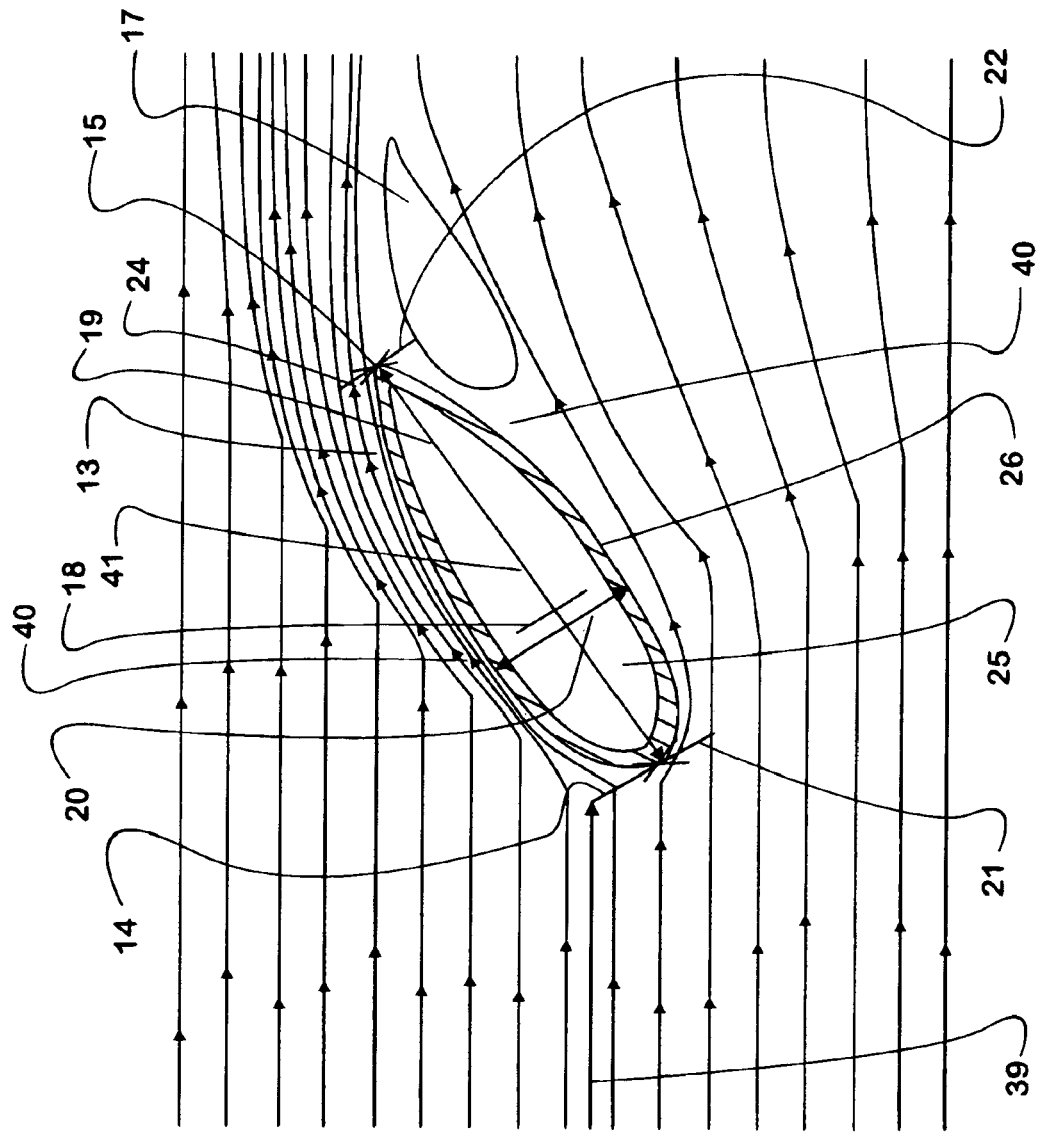

FIG. 17 is a view of the transverse cross-section of the embodiment of an aerodynamic grille bar shown in FIG. 2 with the chord line of the transverse cross-section oriented at a substantial angle to the prevailing fluid inflow direction.

Figure 18:
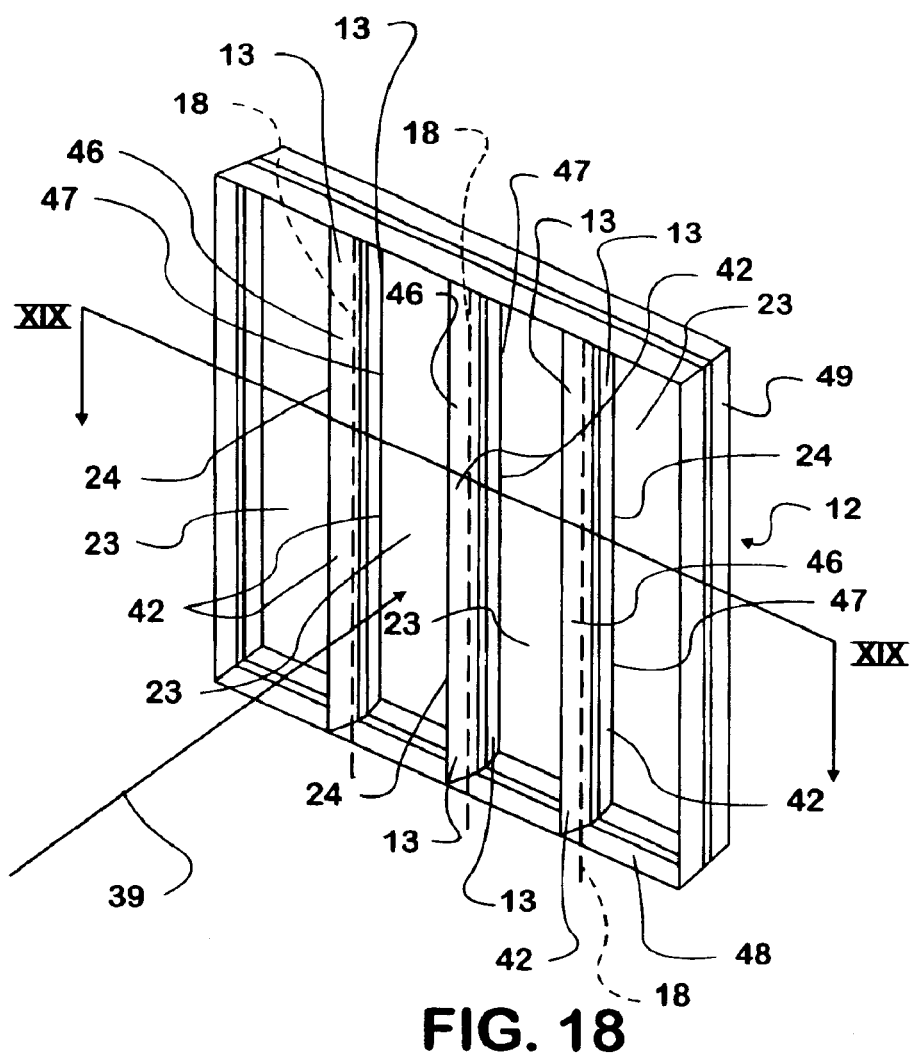

FIG. 18 is a perspective view of a fluid inlet grille according to the present invention that comprises an upstream fluid inlet grille and a downstream fluid inlet grille.

Figure 19:
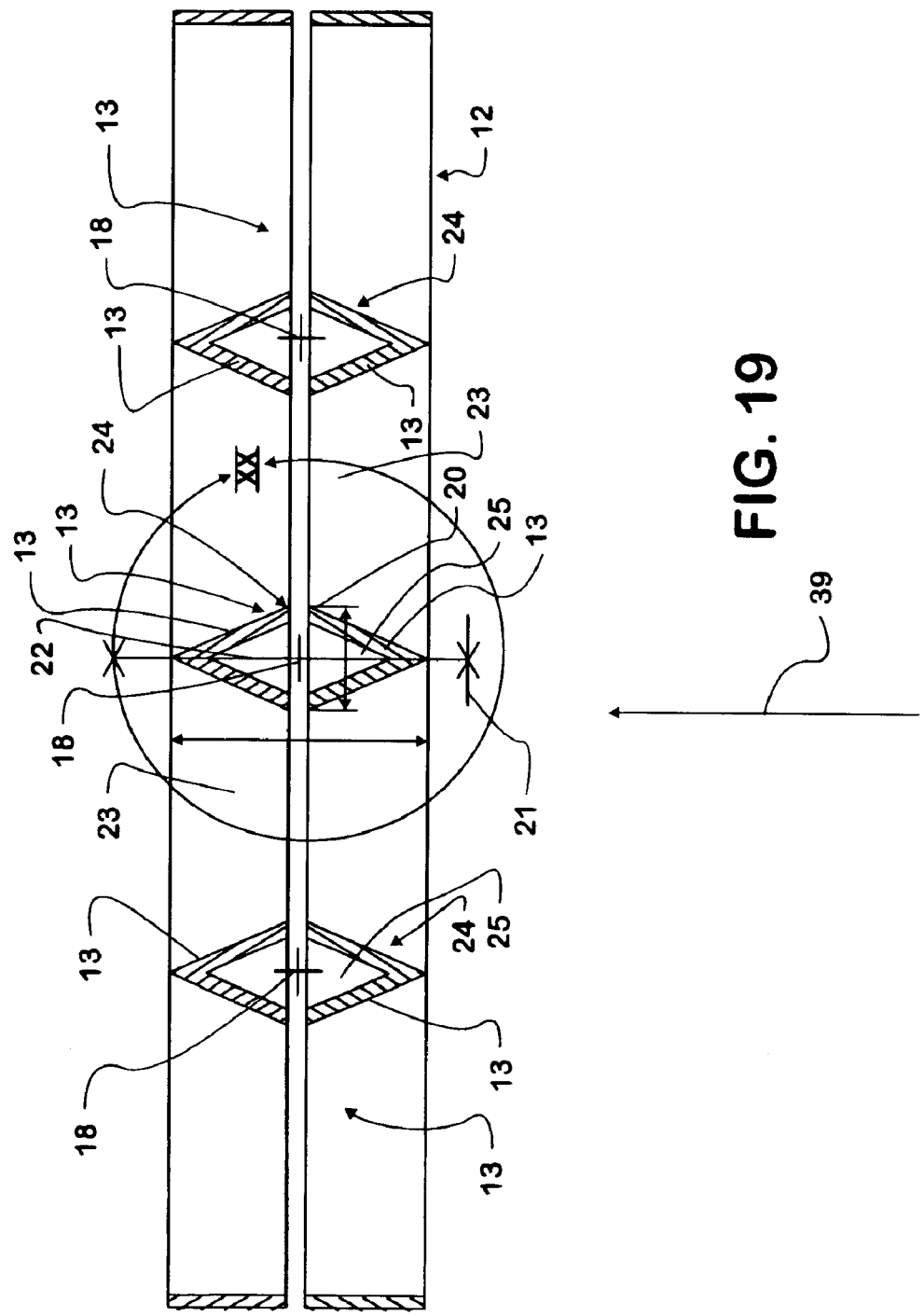

FIG. 19 is a sectional view through line XIX of FIG. 18, on an enlarged scale.

Figure 20:
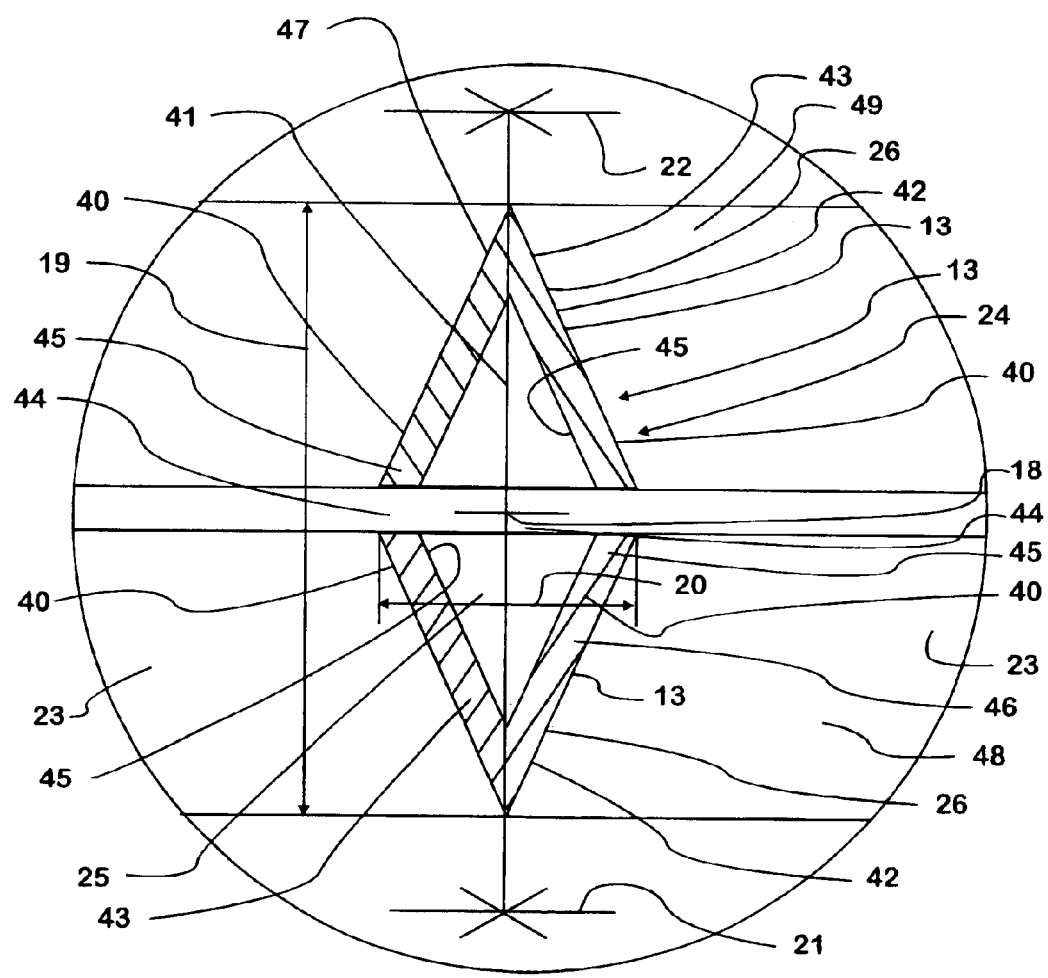

FIG. 20 is a close-up view of the portion of FIG. 19 that is circumscribed by circle XX of FIG. 19.

Figure 21:
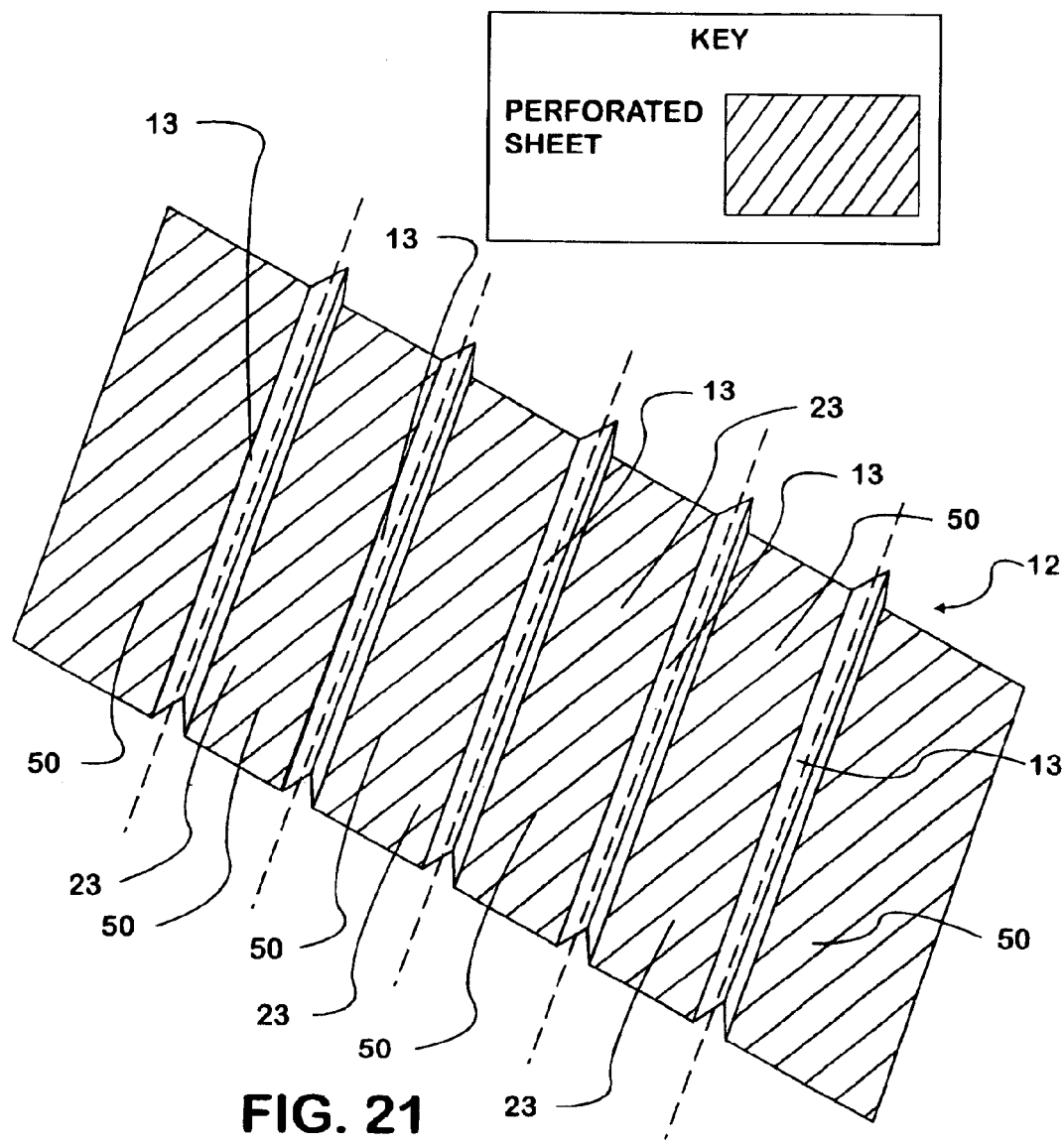

FIG. 21 is a perspective view of a fluid inlet grille that comprises a plurality of grille bars that are integrally formed with perforated sheets that extend between adjacent grille bars.

DETAILS OF INVENTION

The present invention includes both a fluid inlet grille 12 for mounting within a fluid flow inlet 11 and a vehicle 10 with such a fluid inlet grille 12 mounted to it. The fluid inlet grille 12 comprises a plurality of grille bars 13 that have a substantially fixed position relative to one another and each of which extends across some portion of the fluid flow inlet 11, when the fluid inlet grille 12 is mounted within the fluid flow inlet 11. A plurality of fluid flow spaces 23, through which fluid can flow as it flows through the fluid flow inlet 11, within which the fluid inlet grille 12 is mounted, are defined between adjacent grille bars 13 of the fluid inlet grille 12. Thus, the fluid inlet grille 12 allows the flow of fluid through the fluid flow inlet 11 within which it is mounted, while preventing the passage of objects larger than the fluid flow spaces 23, which are defined between the grille bars 13 of the fluid inlet grille 12, through the fluid flow inlet 11. It should be understood that, for purposes of this disclosure, any grille bars 13 that are disposed within the same fluid flow inlet 11 and that have fixed positions relative to one another are considered to be part of the same fluid inlet grille 12 disposed within the fluid flow opening 11. It should also be understood, however, that in some embodiments of the present invention, such as those shown in FIGS. 13a, 18, 19, and 20, a fluid inlet grille 12 may comprise one or more constituent grilles each of which includes a subset of the grille bars 13 of the fluid inlet grille 12 that are attached to one another through a frame structure of the constituent grille to which some of the grille bars 13 of the fluid inlet grille 12 as a whole are not directly attached. Thus, if multiple constituent grilles, such as a first constituent grille with horizontally-disposed grille bars 13 attached to one another by a first frame structure and a second constituent grille with vertically-disposed grille bars 13 attached to one another by a second frame structure, are both disposed within a given fluid inlet opening 11, there is considered to be one fluid inlet grille 12, which comprises the first constituent grille and the second constituent grill, both disposed within the fluid flow inlet 11.

A plurality of the grille bars 13 of the fluid inlet grille 12 of the present invention are aerodynamic grille bars 24. The aerodynamic grille bars 24 provide for a relatively low resistance of the fluid inlet grille 12 to fluid flow through the fluid inlet opening 11 and also provide for a relatively uniform distribution of fluid flow that has passed the aerodynamic grille bars 24 a short distance after it has passed the aerodynamic grille bars 24. Each of the aerodynamic grill bars 24 of the fluid inlet grille 12 has along a majority of its length, a transverse cross-section that has a chord length 19 that is greater than a maximum width 20 and a maximum width 20 that is greater than a trailing edge width 22. Aerodynamic grille bars 24 that have such a shape are shown in FIGS. 1, 2, 2a, 4, 7, 8, 9, 10, 11, 13, 13a, 15, 15a, 16, 17, 19, and 20. As a result of having such a shape, the aerodynamic grille bars 24 of the fluid inlet grille 12 of the present invention present relatively little resistance to fluid flow past them as compared to prior art grille bars 37 such as those shown in FIGS. 5, 6, 12, and 14. Additionally, the stagnation area 17 that exists adjacent the downstream side 15 of the aerodynamic grille bars 24 when fluid flows past them is considerably shorter than the stagnation area 17 that exists adjacent the downstream side 15 of prior art grille bars 37, such as those shown in FIGS. 5, 6, 12, and 14, when fluid flows past them. The stagnation area 17 that occurs adjacent the downstream side 15 of the aerodynamic grille bars 24 is substantially shorter than that which occurs adjacent the downstream side 15 of prior art grille bars 37 such as those shown in FIGS. 5, 6, 12, and 14 because the maximum width 20 of the aerodynamic grille bars 24 occurs at a distance from their downstream side 15 whereas the maximum width 20 of the prior art grille bars 37 occurs at their downstream side 15. Because the aerodynamic grille bars 24 of the fluid inlet grille 12 narrow as they extend from the point at which their maximum width 20 occurs toward their downstream side 15 the portions of fluid flow disposed upon opposite sides of the aerodynamic grille bar 24 can transition toward one another before passing the downstream side 15 of the aerodynamic grille bar 24. By comparison, the portions of fluid flow disposed upon opposite sides of prior art grille bars 37 such as those shown in FIGS. 5, 6, 12, and 14 continue to diverge the entire time they flow past the prior art grille bar 37 and cannot begin to transition back toward one another until after they have passed the downstream side 15 of the prior art grille bar 37. As a result, the distance from the downstream side 15 of a respective grille bar 13 at which fluid that flows past opposite sides of the grille bar 13 can converge is shorter for a aerodynamic grille bar 24 according to the present invention than it is for a prior art grille bar 13 such as those shown in FIGS. 5, 6, 12, and 14.

Each of the aerodynamic grille bars 24 of the fluid inlet grille 12 may have any of a number of shapes in accordance with the guidelines outlined above. The transverse cross-sections of a aerodynamic grille bar 24 may have an outer perimeter that has smooth transitions as it extends around the longitudinal axis 18 as is the case with the aerodynamic grille bars 24 shown in FIGS. 1, 2, 2a, 7, 8, 10, 11, 13, 13a, 15, 15a, and 17. Alternatively, the transverse cross-sections of a aerodynamic grille bar 24 may have an outer perimeter that includes sharp corners, as is the case with the aerodynamic grille bars 24 represented in FIGS. 9, 18, 19, and 20. Additionally, a aerodynamic grille bar 24 may be constructed with an outer wall 26 that at least partially surrounds an interior void 25 of the aerodynamic grille bar 24 as is the case with the aerodynamic grille bars 24 shown in FIGS. 1, 2, 2a, 7, 8, 10, 11, 13, 13a, 15, 15a, 16, 17, 19, and 20, or a aerodynamic grille bar 24 may be of solid construction with no interior void 25 as is the case with the aerodynamic grille bar 24 shown in FIG. 9. Construction of a aerodynamic grille bar 24 with an outer wall 26 that surrounds an interior void 25 provides a aerodynamic grille bar 24 that uses less material than a aerodynamic grille bar 24 of similar strength and solid construction and, therefore, allows for lighter weight of, and less material costs for, the aerodynamic grille bars 24. Aerodynamic grille bars 24 that have an outer wall 26, inside of which an interior void 25 is defined, may be constructed in such a manner that the outer wall 26 completely surrounds the interior void 25. Aerodynamic grille bars 24 that are constructed in such a manner are shown in FIGS. 1, 2, 8, 15, 16, and 17. Alternatively, aerodynamic grille bars 24 that have an outer wall 26, within which an interior void 25 is defined, may be constructed in such a manner that the outer wall 26 does not completely surround the interior void 25 and, thus, the interior void 25 opens into the area surrounding the novel aerodynamic grille bar 24. Aerodynamic grille bars 24 constructed in such a manner are shown in FIGS. 7, 10, 18, 19, and 20. In the preferred embodiment each of the aerodynamic grille bars 24 has an outer wall 26 that completely surrounds an interior void 25 of the novel aerodynamic grille bar 24. In many cases, aerodynamic grille bars 24 that have an outer wall 26 that completely surrounds an interior void 25 of the aerodynamic grille bar 24 have better aerodynamic properties than aerodynamic grille bars 24 that have an outer wall 26 that only partially surrounds an interior void 25 of the aerodynamic grille bar 24. It will, of course, be understood that the fluid inlet grille 12 of the present invention may comprise both aerodynamic grille bars 24 constructed according to the guidelines set forth in this disclosure and prior art grille bars 37 that are not constructed according to the guidelines set forth in this disclosure for the construction of aerodynamic grille bars 24 in accordance with the present invention. It will also be understood that the plurality of aerodynamic grille bars 24 of a fluid inlet grille 12 according to the present invention may include aerodynamic grille bars 24 that have constructions that are different from one another yet within the guidelines of construction of aerodynamic grille bars according to the present invention set forth in this disclosure.

As was mentioned above, the construction of an aerodynamic grille bar 24 with its maximum width 20 disposed at a distance from the downstream side 15 of the aerodynamic grille bar 24 results in a relatively short stagnation area 17 adjacent its downstream side 15 as compared to a prior art grille bar 37 that has its maximum width 20 at its downstream side 15. In fact, all other factors equal, the smaller the trailing edge width 22 of a grille bar 13 is, the shorter the stagnation area 17 adjacent its downstream side 15 will be when fluid flows past it. For this reason, the preferred embodiment of an aerodynamic grille bar 24 according to the present invention has, along a majority of its length, a transverse cross-section that comes to a point at the downstream side 15 of the aerodynamic grille bar 24. A transverse cross-section of an aerodynamic grille bar 24 that comes to a point at the downstream side 15 of the aerodynamic grille bar 24, in such a manner, is considered to have a trailing edge width 22 of zero. The transverse cross-sections of aerodynamic grille bars 24 shown in FIGS. 1, 2, 8, 9, 11, 13, 13a, 15, 15a, 16, 17, 18, 19, and 20 come to a point at the downstream side 15 of the aerodynamic grille bar 24 in such a manner and, therefore, are considered to have a trailing edge width 22 of zero.

The relative location, within a transverse cross-section of a aerodynamic grille bar 24, of the portion of a transverse cross-section of the aerodynamic grille bar 24 that defines the maximum width 20 of that transverse cross-section affects the aerodynamic properties of the aerodynamic grille bar 24. The further the portion of a transverse cross-section of an aerodynamic grille bar 24 that defines the maximum width 20 of that cross-section is from the downstream side 15 of that transverse cross-section, the more time and space fluid flows past opposite sides of the aerodynamic grille bar 24 have to converge toward one another after passing the portion of the transverse cross-section that defines the maximum width 20 thereof. Thus, the further the portion of a transverse cross-section of an aerodynamic grille bar 24 that defines the maximum width 20 of that transverse cross-section is from the downstream side 15 of that transverse cross-section, the shorter will be the stagnation area 17 adjacent the downstream side 15 of that transverse cross-section of the aerodynamic grille bar 24 when fluid flows past it. Thus, for a given transverse cross-section of an aerodynamic grille bar 24 the proportion of the chord length 19 of the transverse cross-section to the distance between the downstream side 15 and the portion that defines the maximum width 20 of the transverse cross-section is a parameter that has a considerable effect upon the aerodynamic properties of the transverse cross-section. FIG. 15 illustrates a transverse cross-section of an aerodynamic grille bar 24 that has a chord length 19 with a magnitude approximately three times the magnitude of the distance between the downstream side 15 and the portion that defines the maximum width thereof. FIGS. 2, 2a, 7, 8, 9, 10, 11,15a, 16, 17, 18, 19, and 20 illustrate transverse cross-sections of aerodynamic grille bars 24 that have chord lengths 19 with magnitudes that are greater than three times the magnitude of the distance between their downstream side 15 and the portions thereof that define the maximum width 20 of the transverse cross-section. It should be understood that, while the foregoing discussion focuses upon a proportion of three to one of the chord-length 19 to the distance between the downstream side 15 and the portion of a transverse cross-section of a novel aerodynamic grille bar 24 that defines the maximum width 20 thereof, in general the smaller the proportion of the chord length 19 to the distance between the downstream side 15 and the portion of a transverse cross-section that defines the maximum width 20 thereof, the better will be the aerodynamic properties of that transverse cross-section of the novel aerodynamic grille bar 24. Additionally, it will be understood that some embodiments of aerodynamic grille bars 24 according to the present invention will have transverse cross-sections that have a portion thereof that has a constant width which is the maximum width 20 of the transverse cross-section. Aerodynamic grille bars 24 with such a transverse cross-section are illustrated in FIGS. 15 and 15a. In the case of such transverse cross-sections of an aerodynamic grille bar 24 that have a portion that has a constant width that is the maximum width 20 of the transverse cross-section, the distance between the downstream side 15 and the portion of the transverse cross-section that defines the maximum width 20, which distance is referenced above, is considered to be the distance between the midpoint of the portion of the transverse cross-section at the downstream side 15 and the portion nearest thereto that defines the maximum width 20 of the transverse cross-section. For example, in the case of the transverse cross-section of a novel aerodynamic grille bar 24 illustrated in FIG. 15, the distance between the downstream side 15 of the cross-section and the portion thereof that defines the maximum width 20 is considered to be the distance between the midpoint of the portion of the transverse cross-section at the downstream side 15 and line M—M which extends through the portion of the transverse cross-section that is the portion of the portion that defines the maximum width 20 that is nearest to the downstream side 15.

In addition to the relative sizes of various portions of transverse cross-sections of a aerodynamic grille bar 24 perpendicular to its longitudinal axis 18, the shapes of those various portions of the transverse cross-sections affect the aerodynamic properties of the aerodynamic grille bar 24.

The side portions 40 of a transverse cross-section of an aerodynamic grille bar 24 may have any of a number of different types of shapes including concave and convex. A side portion 40 of a transverse cross-section of an aerodynamic grille bar 24 that has a convex shape is a side portion 40 that has its radii of curvature disposed upon a same side of that side portion 40 as is the longitudinal axis 18 of the aerodynamic grille bar 24. For example, a side portion 40 that has a convex shape is illustrated by the upper of the two side portions 40 of the transverse cross-section of an aerodynamic grille bar 24 that is illustrated in FIG. 16. A side portion 40 of a transverse cross-section of an aerodynamic grille bar 24 that has a concave shape is a side portion 40 that has its radii of curvature disposed upon an opposite side of that side portion 40 as is the longitudinal axis 18 of the aerodynamic grille bar 24. For example, a side portion 40 that has a concave shape is illustrated by the lower of the two side portions 40 of the transverse cross-section of an aerodynamic grille bar 24 that is illustrated in FIG. 16. Of course it will be understood that, in some cases such as those shown in FIG. 7, a given side portion 40 of a transverse cross-section of an aerodynamic grille bar 24 will comprise both convex and concave sections. FIG. 16 illustrates a transverse cross-section of an aerodynamic grille bar 24 that is in accordance with the present invention and that has one side portion 40 that has a convex shape and one side portion 40 that has a concave shape. FIGS. 1, 2, 11, 13, 15, 17 illustrate transverse cross-sections of aerodynamic grille bars 24 that are in accordance with the present invention and that have side portions 40 that both have a convex shape. Of course it will be understood that there are, nonetheless, embodiments of the present invention that will include aerodynamic grille bars 24 and/or other constructions of grille bars 13 that have transverse cross-sections that have side portions 40 with concave shapes.

Another aspect of the shape of an aerodynamic grille bar 24 according to the present invention that is an important design consideration is the ratio of the chord length 19 to the maximum width 20 of its transverse cross-sections. Generally, the greater the ratio of the chord length 19 to the maximum width 20 of a transverse cross-section of an aerodynamic grille bar 24 according to the present invention, the lesser the resistance that transverse cross-section presents to the flow of fluid past it, and the shorter the stagnation area 17 adjacent the downstream side 15 of that cross-section when fluid flows past it. Thus, it is generally considered that increasing the ratio of the chord length 19 to the maximum width 20 of a transverse cross-section of an aerodynamic grille bar 24 will have an advantageous effect upon the aerodynamic properties of that transverse cross-section. It is also true, however, that the lesser the magnitude of the maximum width 20 of a transverse cross-section of an aerodynamic grille bar 24, the lesser the strength of that transverse cross-section in directions perpendicular to its chord line 41. As a result, in some applications it is advantageous to avoid constructing aerodynamic grille bars 24 with transverse cross-sections that have excessively large ratios of their chord length 19 to their maximum width 20 in order to enable the aerodynamic grille bars 24 to comply with space constraints while maintaining appropriate levels of strength of the aerodynamic grille bars 24.

Figure 8:
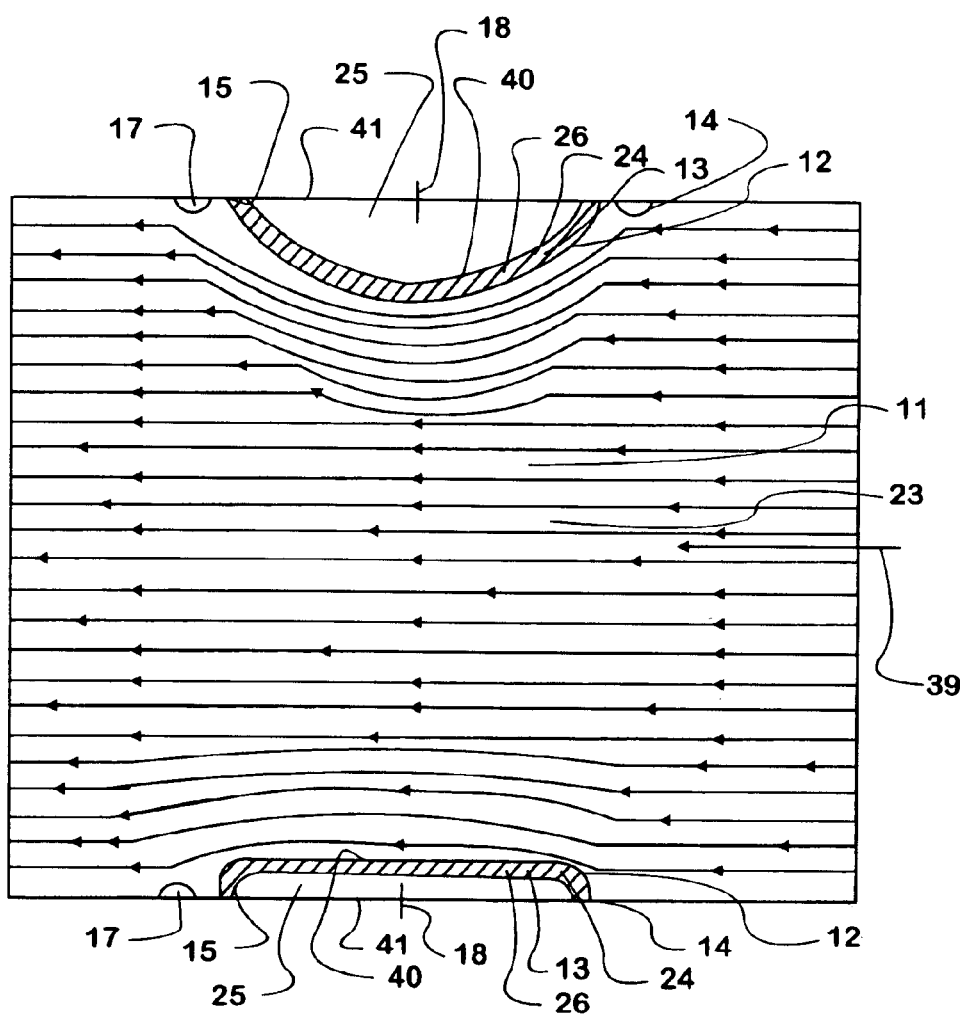
FIG. 8 is an enlarged view of the portion of FIG. 1 disposed within a zone 8 showing fluid flow patterns through a fluid flow space defined between adjacent aerodynamic grille bars of a fluid inlet grille according to the present invention.

The plurality of aerodynamic grille bars 24 of the fluid inlet grille 12 of the present invention may be positioned and oriented in any of a number of ways relative to one another. In the preferred embodiment a plurality of the aerodynamic grille bars 24 are oriented and positioned such that their longitudinal axes 18 extend substantially parallel to one another. Adjacent aerodynamic grille bars 24 that are positioned in such a manner relative to one another define a fluid flow space 23 between them that, from some point in front of the downstream side 15 of the fluid inlet grille 12, continually widens as it extends toward the downstream side 15 of the fluid inlet grille 12. Such a fluid flow space 23, that has such a shape as a result of being defined between adjacent aerodynamic grille bars 24 whose longitudinal axes 18 are disposed parallel to one another, is best illustrated in FIG. 8. As a result of these relationships, two adjacent aerodynamic grille bars 24 that are positioned such that their longitudinal axes 18 are parallel to one another act as a nozzle when fluid flows through the fluid flow space 23 defined between them. When fluid flows through the portion of such a fluid flow space 23 that widens as it extends towards the downstream side 15 of the fluid inlet grille 12 there is an advantageous recovery of pressure within the fluid. It will, of course, be understood that a fluid inlet grille 12 according to the present invention may comprise, in addition to a plurality of aerodynamic grille bars 24 that are positioned and oriented with their longitudinal axes 18 substantially parallel to one another, one or more grille bars 13, which may or may not comprise one or more aerodynamic grille bars 24, that are oriented and positioned in other manners.

In addition to the orientation of the longitudinal axes 18 of aerodynamic grille bars 24 relative to one another, the orientation of each transverse cross-section of the aerodynamic grille bars 24 relative to the prevailing fluid inflow direction 39 has a significant effect upon the aerodynamic characteristics of a fluid inlet grille 12 according to the present invention. In particular, the angle between the prevailing fluid inflow direction 39 and the chord line 41 of a transverse cross-section of an aerodynamic grille bar 24 has a significant effect upon the flow of fluid past that transverse cross-section of the aerodynamic grille bar 24. FIG. 17 illustrates a transverse cross-section of an aerodynamic grille bar 24 with that transverse cross-section having its chord line 41 disposed at a relatively large angle to the prevailing fluid inflow direction 39. Each of FIGS. 1, 2, 2a, 8, 11, 15, 15a, 16, 18, 19, and 20 illustrates a transverse cross-section of an aerodynamic grille bar 24 with that transverse cross-section having its chord line 41 disposed at a relatively small angle to the prevailing fluid inflow direction 39. The smaller the angle between the prevailing fluid inflow direction 39 and the chord-line 41 of a transverse cross-section of an aerodynamic grille bar 24, the smaller the stagnation area 17 upon the downstream side 15 of the transverse cross-section when fluid flows past it. As a result, it is generally advantageous that a fluid inlet grille 12 according to the present invention be constructed with the aerodynamic grille bars 24 thereof oriented in such a manner to minimize the angle between the prevailing fluid inflow direction 39 and the chord lines 41 of transverse cross-sections of its aerodynamic grille bars 24.

As was mentioned above, a fluid inlet grille 12 according to the present invention could be utilized in any of a number of different applications. In the preferred embodiment, the fluid inlet grille 12 of the present invention is mounted to a vehicle 10. The vehicle 10 to which the fluid inlet grille 12 is mounted in the preferred embodiment includes one or more frame structure(s) 27. Each of the frame structure(s) 27 of the vehicle 10 is a relatively rigid and strong structure. A large percentage of the components and assemblies of the vehicle 10 are engaged directly to the frame structure(s) 27 of the vehicle 10, and those components of the vehicle 10 that are not engaged directly to the frame structure(s) 27 are engaged indirectly to them. As a result of their relatively rigid and strong construction and the manner in which they are engaged to other components of the vehicle 10, the frame structure(s) 27 of the vehicle 10 function to maintain proper relative locations of most of the components, assemblies, and systems of the vehicle 10. The vehicle 10 to which the fluid inlet grille 12 is mounted in the preferred embodiment also includes a suspension system 28 that is engaged to one or more of the frame structure(s) 27 of the vehicle 10. The suspension system 28 supports the frame structure(s) 27 to which it is engaged above the ground and, thus, supports the other components, assemblies, and systems 10 above the ground. The suspension system 28 is also constructed in such a manner to provide the vehicle 10 with a relatively low resistance to movement along the ground. The vehicle 10, to which the fluid inlet grille 12 is mounted in the preferred embodiment, further comprises one or more body structures 29 that are mounted to one or more of the frame structure(s) 27 of the vehicle 10. In the preferred embodiment, one of the body structure(s) 29 of the vehicle 10 is an operator cabin 30 within which an individual may reside while operating the vehicle 10. The vehicle 10, to which the fluid inlet grille 12 is mounted in the preferred embodiment, also comprises a powertrain 31 for driving the vehicle 10. The powertrain 31 of the vehicle 10 comprises an internal combustion engine 32 and an engine cooling system 33 for maintaining the temperature of the internal combustion engine 32 below levels detrimental to the longevity of the internal combustion engine 32. The engine cooling system 33 comprises a radiator 34 for transferring heat from engine cooling liquid to air in the environment surrounding the vehicle 10. An engine enclosure body structure 35 of the vehicle 10 surrounds, to the top and the sides, the internal combustion engine 32 and the radiator 34 of the vehicle 10. The engine enclosure body structure 35 could consist of a single component with those portions that surround the internal combustion engine 32 to the top and sides being integrally formed as a single unitary structure. Alternatively, the engine enclosure body structure 35 may comprise multiple components that are attached to one another through various engagement means that may or may not allow the multiple components of the engine enclosure body structure 35 to move relative to one another. The engine enclosure body structure 35 defines, in front of the radiator 34, a fluid flow inlet 11 through which air in front of the vehicle 10 flows when the vehicle 10 travels forward. When the vehicle 10 travels forward in such a manner and air flows through the fluid flow inlet 11 disposed in front of the radiator 34, the air subsequently flows through the radiator 34 and heat is transferred from engine cooling liquid flowing through the tubes of the radiator 34 to the air flowing through the radiator 34. The fluid inlet grille 12 is mounted within the fluid flow inlet 11 defined by the engine enclosure body structure 35 and prevents large objects from traveling through the fluid flow inlet 11 and impacting and damaging the radiator 34 of the vehicle 10. The vehicle 10 also preferably includes a fan 36 disposed upon a side of the radiator 34 opposite the fluid flow inlet 11. When in operation, the fan 36 pulls air in through the fluid flow inlet 11 and through the radiator 34 if the vehicle 10 is not moving forward and serves to increase the rate of flow of air through the fluid flow inlet 11 and the radiator 34 if the vehicle 10 is moving forward.

The construction of the fluid inlet grille 12 with aerodynamic grille bars 24 as described above provides a number of advantages in the application described above where the fluid inlet grille 12 is mounted in front of a radiator 34 of a vehicle 10. The fluid inlet grille 12 of the present invention, with its aerodynamic grille bars 24 presents relatively little resistance to flow of air through the fluid flow inlet 11 in front of the radiator 34 as compared to prior art fluid inlet grilles 38 that have been mounted within fluid flow inlets 11 in front of radiators 34 of vehicles 10. As a result, all other factors being equal, the rate of flow of air through the fluid flow inlet 11 and the radiator 34 that is disposed behind it is greater for a vehicle 10 that has the fluid inlet grille 12 of the present invention mounted within the fluid flow inlet 11 than it is for a vehicle 10 with a prior art fluid inlet grille 38 mounted within the fluid flow inlet 11 in front of the radiator 34. The increased rate of flow of air through the radiator 34 that is effected by implementing the fluid inlet grille 12 of the present invention, as compared to prior art fluid inlet grilles 38, results in an increased rate of heat transfer from the engine cooling liquid flowing through the tubes of the radiator 34 and improved performance of the engine cooling system 33. Additionally, all other factors being equal, the stagnation area 17 that is present upon the downstream side 15 of the aerodynamic grille bars 24 of the fluid inlet grille 12 of the present invention when air flows through it, is shorter than the stagnation area 17 that is present upon the downstream side 15 of prior art grille bars 37 of prior art fluid inlet grilles 38 when air flows through them. If the radiator 34 of a vehicle 10 is mounted close enough to the downstream side 15 of a fluid inlet grille 12, 38 that it overlaps the stagnation areas 17 adjacent the downstream side 15 of one or more of the grille bars 13 of a fluid inlet grille 12, 38, the performance of the radiator 34 is compromised. In such a situation those portions of the radiator 34 disposed within a stagnation area 17 downstream of a grille bar 13 have air flowing through them at a substantially lower velocity than do portions of the radiator 34 disposed directly downstream of fluid flow spaces 23 defined between the grille bars 13 of the fluid inlet grille 12, 38. By contrast, if a radiator 34 (or other similar heat exchanger) is mounted at a distance from a fluid inlet grille 12, 38 such that the radiator 34 is disposed beyond the stagnation areas 17 upon the downstream side 15 of the grille bars 13 the portions of the radiator 34 that are disposed downstream of the grille bars 13 have fluid flowing through them at substantially the same rate as, and transfer heat at substantially the same rate as, portions of the radiator 34 that are disposed downstream of the fluid flow spaces 23 that are defined between the grille bars 13 of the fluid inlet grille 12, 38. Thus, the use of a fluid inlet grille 12 constructed according to the present invention allows for mounting of a radiator 34 relatively close to the fluid inlet grille 12 on its downstream side 15 without causing the performance of the engine cooling system 33 to be compromised because the radiator 34 is disposed within the stagnation areas 17 of one or more grille bars 13 of the fluid inlet grille 12. This is beneficial as space for mounting components and systems on vehicles 10 continues to become more and more scarce and cooling demands on engine cooling systems 33 continue to become greater and greater as the power of the internal combustion engines 32 of vehicle powertrains 31 continues to rise.

Analysis has shown at least one embodiment of a fluid inlet grille 12 constructed according to the present invention, with aerodynamic grille bars 24 that are also constructed according to the present invention, to have substantially better aerodynamic properties than a comparable prior art fluid inlet grille 38. Computational fluid dynamics analysis software has been utilized to analyze the aerodynamic properties of an aerodynamic grille bar 24 with the transverse cross-section shown in FIG. 11, which is in accordance with the present invention, and also to analyze the aerodynamic properties of a prior art grille bar 37 that has the transverse cross-section shown in FIG. 12. The computational fluid dynamics analyses that were performed on the grille bars 13 of FIGS. 11 and 12 were each configured to simulate airflow past a grille bar 13 that is part of a fluid inlet grille 12 that comprises additional grille bars 13 that have the same transverse cross-section as the subject grille bar 13. FIG. 13 shows a cross-section of a fluid inlet grille 12 that comprises a plurality of aerodynamic grille bars 24 of the transverse cross-section that is in accordance with the present invention and that is shown in FIG. 11. FIG. 14 shows a cross-section of a fluid inlet grille 12 that comprises a plurality of prior art grille bars 37 of the transverse cross-section that is shown in FIG. 12. Two different analyses, of the aerodynamic properties of both the aerodynamic grille bar 24 shown in FIG. 11 and the prior art grille bar 37 shown in FIG. 12 were performed. The first analyses of the two grille bars 13 shown in FIGS. 11 and 12 respectively were configured to simulate conditions that would occur when a vehicle 10, to which the fluid inlet grille 12, which comprises the subject grille bar 13, is mounted as described above, travels forward at 15 miles per hour with the fan 36 disposed behind the radiator 34 operating at 1600 RPM. The results of these first analyses show that, at a vehicle speed of 15 miles per hour, the flow rate of air past a fluid inlet grille 12 with aerodynamic grille bars 24 of the transverse cross-section shown in FIG. 11 should be 3.5% greater than the flow rate of air past a prior art fluid inlet grille 38 with prior art grille bars 37 of the transverse cross-section shown in FIG. 12. The second analyses of the two grille bars 13 shown in FIGS. 11 and 12 respectively were configured to simulate conditions that would occur when a vehicle 10, to which a fluid inlet grille 12, which comprises the subject grille bar 13, were mounted as described above, travels forward at a rate of 30 miles per hour with the fan 36 behind the radiator 34 operating at 1600 RPM. The results of these second analyses show that, at a vehicle speed of 30 miles per hour, the flow rate of air past the fluid inlet grille 12 with aerodynamic grille bars 24 of the transverse cross-section shown in FIG. 11 should be 5% higher than the flow rate of air past the prior art fluid inlet grille 38 with prior art grille bars 37 of the transverse cross-section shown in FIG. 12. The analyses of the aerodynamic properties of the aerodynamic grille bar 24 represented in FIG. 11 and the prior art grille bar 37 represented in FIG. 12 were both configured to simulate identical conditions except for the differences between the transverse cross-sections of the respective grille bars 13, and the speed of the vehicle 10. In addition to estimates of rates of fluid flow past grille bars 13 of the transverse cross-sections shown in FIGS. 11 and 12, the above-described computational fluid dynamics analyses were used to produce qualitative information including predicted patterns of airflow around grille bars 13 of the transverse cross-sections shown in FIGS. 11 and 12. FIG. 11 also shows the pattern of airflow that a computational fluid dynamics analysis predicts would occur past the aerodynamic grille bar 24 of the transverse cross-section shown in that figure. FIG. 12 also shows the pattern of airflow that a computational fluid dynamics analysis predicts would occur past the prior art grille bar 37 of the cross-section shown in that figure. It is evident by studying FIGS. 11 and 12 that the analyses show a much shorter stagnation area 17 adjacent the downstream side 15 of the aerodynamic grille bar 24 shown in FIG. 11 than the stagnation area 17 present upon the downstream side 15 of the prior art grille bar 37 shown in FIG. 12.

In some embodiments of the present invention, such as the one shown in FIG. 21, a perforated sheet 50 such as a screen extends across one or more of the fluid flow spaces 23 between the grille bars 13 of a fluid inlet grille 12. Such a perforated sheet functions to prevent objects smaller than the fluid flow spaces 23 from passing through the fluid flow inlet 11 without substantially impeding the flow of fluid through the fluid flow inlet 11. In some embodiments of the present invention such a perforated sheet 50 is attached to one or more of the grille bars 13 of a fluid inlet grille 12. Attachment of a perforated sheet 50 to grille bars 13 in such a manner provides a relatively strong anchoring of the perforated sheet 50 to the fluid inlet grille 12, thus, reducing the likelihood of the perforated sheet 50 being separated from the fluid flow inlet 11 when objects impact the perforated sheet 50.

In addition to or instead of novel aerodynamic grille bars 24 that are of monolithic construction, such as those shown in FIGS. 1, 2, 7, 8, 9, 10, 11, 13, 15, 16, and 17, a fluid inlet grille 12 may include aerodynamic grille bars 24 that are of composite construction, such as those shown in FIGS. 2a, 13a, 15a, 18, 19, and 20. An aerodynamic grille bar 24 that is of a composite construction comprises two or more constituent grille bars 42 that are positioned adjacent one another with their axes parallel to one another and with ends 45 of their outer walls 43 disposed adjacent one another. It should be noted that with a very limited number of exceptions the details of the construction of an aerodynamic grille bar 24 that is of a composite construction and a fluid inlet grille 12 that comprises it may be the same as the details of construction of an aerodynamic grille bar 24 that is of monolithic construction and a fluid inlet grille 12 that comprises it. The longitudinal axis 18 of aerodynamic grille bar 24 of composite construction is defined parallel to the longitudinal axes of the constituent grille bars 42 that make up the aerodynamic grille bar 24. An outer wall 26 of an aerodynamic grille bar 24 that is of composite construction is constituted by the aggregate of the outer walls 43 of the constituent grille bars 42 that make up the aerodynamic grille bar 24. Because it is made up of the outer walls 43 of the constituent grille bars 42, the outer wall 26 of an aerodynamic grille bar 24 that is of composite construction may have gaps 44 between the ends 45 of the outer walls 43 of the constituent grille bars 42 that make it up. In order for two or more grille bars to be considered to be the constituent grille bars 42 of an aerodynamic grille bar 24 formed thereby, any such gaps 44 should have a length of less than 20% of the chord length 19 of the aerodynamic grille bar 24. In fact, the smaller the gaps 44 are between the ends 45 of the outer walls 43 of the constituent grille bars 42 the less the aerodynamic grille bar 24 made up of those Constituent grille bars 42 will disturb the flow of air around it. In other words, in a grille bar of composite construction, walls 43 form opposite sides that extend in the direction of flow from a leading end of the grille bar to a trailing end of the grille bar. The sides endow the grille bar with a shape that in transverse cross section has a chordal dimension measured in the direction of flow, i.e. chord line 41 in FIG. 20, and a width measured perpendicular to the chordal dimension, the maximum width being designated 20 in FIG. 20. Each side comprises an outer surface exposed to flow through the grille between the grille bars, and each side further comprises one of the gaps 44 extending lengthwise of the grille bar to impart discontinuity to the respective outer surface between leading and trailing ends of the grille bar. Gaps 44 open to a hollow interior space that is otherwise enclosed by the sides of the grille bar.

In some embodiments of the present invention, such as those shown in FIGS. 2a, 13a, 15a, 18, 19, and 20, one or more of the constituent grille bars 42 of an aerodynamic grille bar 24 have an open-shape construction. A constituent grille bar 42 that has an open-shape construction is of such a shape that there exists at least one direction that is perpendicular to the longitudinal axis of the constituent grille bar 42 and in which a line passing through any portion of the constituent grille bar 42 will intersect its outer surfaces at only two places. In some embodiments of the present invention, such as the one shown in FIG. 21, a fluid inlet grille has an open-shape construction. A fluid inlet grille with an open shape construction has a shape such that there exists at least one direction that is perpendicular to the longitudinal axis of one or more of its grille bars and in which a line passing through any portion of the fluid inlet grille will intersect its outer surfaces at only two places. A component that has such an open-shape construction can be constructed relatively economically by molding it between two halves of a mold and subsequently separating the two halves of the mold from one other to allow removal of the component from the mold.

In some embodiments of the present invention, such as those shown in FIGS. 2a, 13a, 15a, 18, 19, and 20, an aerodynamic grille bar 24 that is of composite construction is made up of an upstream constituent-grille-bar 46 that defines the upstream side of the aerodynamic grille bar 24 and a downstream constituent-grille-bar 47 that is disposed adjacent the upstream constituent-grille-bar 46 on a downstream side thereof and that defines the downstream side of the aerodynamic grille bar 24. In some such embodiments of the present invention, such as those shown in FIGS. 2a, 13a, 15a, 18, 19, and 20, the upstream constituent-grille-bar 46 has the ends 45 of its outer wall 43 disposed upon opposite sides of the chord line 41 of the aerodynamic grille bar 24 and adjacent the ends 45 of the outer wall 43 of the downstream constituent-grille-bar 47 which are also disposed upon opposite sides of the chord line 41 of the aerodynamic grille bar 24.

The constituent grille bars 42 of a aerodynamic grille bar 24 that is of composite construction may be maintained in their proper adjacent positions through any of a number of different means that are well-known to and/or easily imaginable by a person of ordinary skill in the art. In some embodiments of the present invention, such as the one shown in FIGS. 18, 19, and 20, a fluid inlet grille 12 comprises a constituent grille that is an upstream, or leading, fluid inlet grille 48 which comprises a frame structure to which a plurality of upstream, or leading, constituent-grille-bars 46 are attached. In some embodiments of the present invention such as the shown in FIGS. 18, 19, and 20, the fluid inlet grille 12 comprises a constituent grille that is a downstream, or trailing, fluid inlet grille 49 which comprises a frame structure to which a plurality of downstream, or trailing, constituent grille bars 49 are attached. In embodiments of the present invention that include an upstream fluid-inlet grille 48, downstream constituent grille bars 47 can be positioned adjacent a downstream side of one or more of the upstream constituent grille bars 46 of the upstream fluid inlet grille 48 in order to form therewith one or more aerodynamic grille bars 24 of composite construction according to the present invention. In such embodiments the downstream constituent grille bars 47 may be maintained adjacent the upstream constituent grille bars 46 through an innumerable variety of means well-known to and/or easily imaginable by one of ordinary skill in the art. In embodiments of the present invention that include a downstream fluid-inlet grille 49, upstream constituent grille bars 46 can be positioned adjacent an upstream side of one or more of the downstream constituent grille bars 47 of the downstream fluid inlet grille 49 in order to form therewith one or more aerodynamic grille bars 24 of composite construction according to the present invention. In such embodiments the upstream constituent grille bars 46 may be maintained adjacent the downstream constituent grille bars 47 through an innumerable variety of means well-known to and/or easily imaginable by one of ordinary skill in the art. In some embodiments of the present invention, such as the one shown in FIGS. 18, 19, and 20, a downstream fluid inlet grille 49 is mounted on a downstream side of an upstream fluid inlet grille 48 in such a manner that one or more of the downstream constituent-grille-bars 47 of the downstream fluid inlet grille 49 are disposed upon a downstream side of one or more of the upstream constituent-grille-bars 46 of the upstream fluid inlet grille 48 and therewith form one or more aerodynamic grille bars 24 of composite construction according to the present invention. In such an embodiment of the present invention the upstream fluid inlet grille 48 and the downstream fluid inlet grille 49 effectively form, in aggregate, a fluid inlet grille with one or more aerodynamic grille bars 24 that are of a composite construction.

A fluid inlet grille according to the present invention, whether a fluid inlet grille that comprises a plurality of aerodynamic grille bars 24 of monolithic construction, an upstream fluid inlet grille 48 with a plurality of upstream constituent-grille-bars 46, a downstream fluid inlet grille 49 with a plurality of downstream constituent-grille-bars 47, or any other fluid inlet grille for that matter, may have any of a number of different constructions of frame structure to which its grille bars are attached and any of a number of different means of attachment of those grille bars to the frame structure. In some embodiments of the present invention, such as the one shown in FIGS. 18, 19, and 20, the frame structure may include one or more frame members that are engaged to and extend between the grille bars. In some embodiments of the present invention, such as the one shown in FIG. 21, the frame structure of a fluid inlet grille includes, in addition to, or alternative to, frame members, a perforated sheet 51, such as a screen, that is attached to and extends between adjacent grille bars of the fluid inlet grille. In some embodiments of the present invention, such as the one shown in FIG. 21, a fluid inlet grille comprises grille bars that are integrally formed with one or more perforated sheets 50 that extend between them. Grille bars may be integrally formed with a perforated sheet 50 that extends between them in any of a number of different ways. Grille bars and a perforated sheet 50 that extends between them may be integrally formed by molding them as a single unitary component. Grille bars and a perforated sheet 50 that extends between them may be integrally formed by stamping or roll-forming them from a single piece of material such as a sheet of steel. Alternatively, grille bars may be integrally formed with a non-perforated sheet that extends between them through any of the above-mentioned methods or extrusion and perforations subsequently formed in the sheet that extends between the grille bars.

It will, of course, be understood that a fluid inlet grille 12 of the present invention and any vehicle 10 that a fluid inlet grille 12 according to the present invention may be mounted to could be of any of a number of different constructions within the guidelines set forth above and that some features of the invention could be employed without a corresponding use of other features.

We claim:

1. A vehicle comprising:

structure that defines a flow inlet; and a grille that is disposed in the flow inlet and through which flow passes in a direction generally normal to the flow inlet;

the grille comprising grille bars that have lengths extending across the flow inlet and that are arranged side-by-side and spaced apart to allow flow between them;

each grille bar comprising opposite sides that extend in the direction of flow from a leading end of the grille bar to a trailing end of the grille bar and that endow the grille bar with a shape that in transverse cross section has a chordal dimension measured in the direction of flow and a width measured perpendicular to the chordal dimension, each side comprising an outer surface exposed to flow through the grille between the grille bars, and each side further comprising a gap extending lengthwise of the grille bar to impart discontinuity to the respective outer surface between leading and trailing ends of the grille bar, wherein each gap has a dimension measured parallel to the chordal dimension of the respective grille bar that is less than 20% of the chordal dimension of the respective grille bar as measured from leading end to trailing end of the respective grille bar.

2. A vehicle as set forth in claim 1, wherein each gap is disposed substantially at the maximum width of the respective grille bar.

3. A vehicle as set forth in claim 2 wherein the sides of each grille bar converge toward each other both in a direction from the respective gaps toward the leading end and in a direction from the respective gaps toward the trailing end.

4. A vehicle comprising:

structure that defines a flow inlet; and a grille that is disposed in the flow inlet and through which flow passes in a direction generally normal to the flow inlet;

the grille comprising grille bars that have lengths extending across the flow inlet and that are arranged side-by-side and spaced apart to allow flow between them;

each grille bar comprising opposite sides that extend in the direction of flow from a leading end of the grille bar to a trailing end of the grille bar and that endow the grille bar with a shape that in transverse cross section has a chordal dimension measured in the direction of flow and a width measured perpendicular to the chordal dimension, each side comprising an outer surface exposed to flow through the grille between the grille bars, and each side further comprising a extending lengthwise of the grille bar to impart discontinuity to the respective outer surface between leading and trailing ends of the grille bar, wherein the gaps of each grille bar open to a hollow interior space otherwise enclosed by the sides of the grille bar.

5. A vehicle as set forth in claim 4 wherein each grille bar comprises a leading bar member and a trailing bar member that cooperatively define the gaps of the grille bar and that have confronting concave interiors that cooperate in defining the hollow interior space.

6. A vehicle as set forth in claim 5 wherein the leading bar members are mounted in a leading frame, and the trailing bar members are mounted in a trailing frame.

7. A vehicle comprising:

structure that defines a flow inlet; and a grille that is disposed in the flow inlet and through which flow passes in a direction generally normal to the flow inlet;

the grille comprising a leading frame and a trailing frame, each of which comprises respective grille bar members;

each grille bar member of one frame being cooperatively arranged with a corresponding grille bar member of the other frame to form a respective grille bar that has a length extending across the flow inlet with the grille bars being arranged side-by-side and spaced apart to allow flow between them;

each grille bar comprising opposite sides that, along the grille bar length, extend in the direction of flow from a leading end of the grille bar member of the leading frame to a trailing end of the grille bar member of the trailing frame so as to comprise respective side portions of the leading and trailing grille bar members and endow the grille bar with a shape that in transverse cross section has a chordal dimension measured in the direction of flow and a width measured perpendicular to the chordal dimension, with each side of the grille bar being rendered discontinuous by a respective gap running lengthwise of the grille bar between the trailing end of the leading grille bar member and the leading end of the trailing grille bar member.

8. A vehicle as set forth in claim 7 wherein each gap has a dimension measured parallel to the chordal dimension of the respective grille bar that is less than 20% of the chordal dimension of the respective grille bar as measured from leading end of the respective leading grille bar member to the trailing end of the respective trailing grille bar member.

9. A vehicle as set forth in claim 8 wherein each gap is disposed substantially at the maximum width of the respective grille bar.

10. A vehicle as set forth in claim 9 wherein the side portions of each leading grille bar member diverge from each other in a direction toward the respective trailing grille bar member and the side portions of the respective trailing grille bar member converge toward each other in a direction away from the respective leading grille bar member.

11. A vehicle as set forth in claim 7 wherein the side portions of each leading grille bar member diverge from each other in a direction toward the respective trailing grille bar member and the side portions of the respective trailing grille bar member converge toward each other in a direction away from the respective leading grille bar member.

12. A vehicle as set forth in claim 7 wherein the gaps of each grille bar open to a hollow interior space otherwise enclosed by the respective leading grille bar member and the respective trailing grille bar member coextensive with the lengths of the gaps.

13. A vehicle as set forth in claim 12 wherein each leading grille bar member and respective trailing grille bar member have confronting concave interiors surfaces.

14. A vehicle as set forth in claim 7 wherein the chordal dimension of each grille bar, as measured from the leading end of the leading grille bar member to the trailing end of the trailing grille bar member, is greater than three times the maximum width dimension of the grille bar.

* * * * *